United States Patent
Horikawa

(10) Patent No.: US 8,203,743 B2
(45) Date of Patent: Jun. 19, 2012

(54) FORM PROCESSING DEVICE INCLUDING A WRITTEN IMAGE EXTRACTION DEVICE

(75) Inventor: Hirofumi Horikawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 1037 days.

(21) Appl. No.: 12/121,159

(22) Filed: May 15, 2008

(65) Prior Publication Data

US 2008/0291502 A1 Nov. 27, 2008

(30) Foreign Application Priority Data

May 23, 2007 (JP) ................................ 2007-137223

(51) Int. Cl.
- *G06K 15/00* (2006.01)
- *G06F 3/12* (2006.01)
- *H04N 1/60* (2006.01)
- *G06Q 10/00* (2012.01)

(52) U.S. Cl. ..................... 358/1.18; 358/1.15; 358/1.16; 358/1.9; 358/540; 705/7.27

(58) Field of Classification Search .................... 358/1.1, 358/1.15, 1.16, 1.9, 1.2, 1.18, 540; 705/7.27
See application file for complete search history.

(56) References Cited

U.S. PATENT DOCUMENTS

| | | | |
|---|---|---|---|
| 5,887,088 A | 3/1999 | Kurokawa et al. | |
| 2004/0044955 A1 | 3/2004 | Shimada et al. | |
| 2006/0007189 A1* | 1/2006 | Gaines et al. | 345/179 |

FOREIGN PATENT DOCUMENTS

| | | |
|---|---|---|
| DE | 199 48 330 A1 | 3/2000 |
| EP | 1 683 585 A1 | 7/2006 |
| JP | 2005-234790 | 9/2005 |
| JP | 2006-18492 | 1/2006 |
| JP | 2006-155551 | 6/2006 |
| JP | 2006-323486 | 11/2006 |
| JP | 2007-87322 | 4/2007 |
| WO | WO 2006/017229 A2 | 2/2006 |

OTHER PUBLICATIONS

Japanese Office Action issued Nov. 8, 2011, in Patent Application No. 2007-137223.

\* cited by examiner

*Primary Examiner* — Thomas Lett
(74) *Attorney, Agent, or Firm* — Oblon, Spivak, McClelland, Maier & Neustadt, L.L.P.

(57) ABSTRACT

A disclosed document processing device for processing image data includes a medium identification information acquiring unit configured to acquire medium identification information from an image of the medium identification information included in the image data; a process information acquiring unit configured to acquire, based on the medium identification information, process information pertaining to a currently-executing process in a currently-executing workflow associated with the medium identification information; a form definition information acquiring unit configured to acquire, based on the process information pertaining to the currently-executing process, form definition information of a form corresponding to the currently-executing process; and a region image acquiring unit configured to acquire, based on the form definition information, a region image of a predetermined region in the image data, which predetermined region corresponds to an entry region in the form where written-input information is written in at the currently-executing process.

20 Claims, 19 Drawing Sheets

FIG.8

| | | |
|---|---|---|
| Entry space process setting (set any one choice) | Recognize tick mark | Execute OMR process on specified region |
| | Output value when ticked | Output value when OMR result is TRUE |
| | Output value when not ticked | Output value when OMR result is FALSE |
| | Recognize handwritten characters | Execute OCR process on specified region |
| | Cut out image | Save specified region as image |
| | Read barcode | Execute barcode decoding process on specified region |

FIG.9

| Mandatory entry space setting | Optional entry space | Entry may not be input in some cases |
| --- | --- | --- |
| | Mandatory entry space | Target of checking for missing entry |
| | Mandatory entry space with condition | Entry is mandatory only when condition is satisfied |

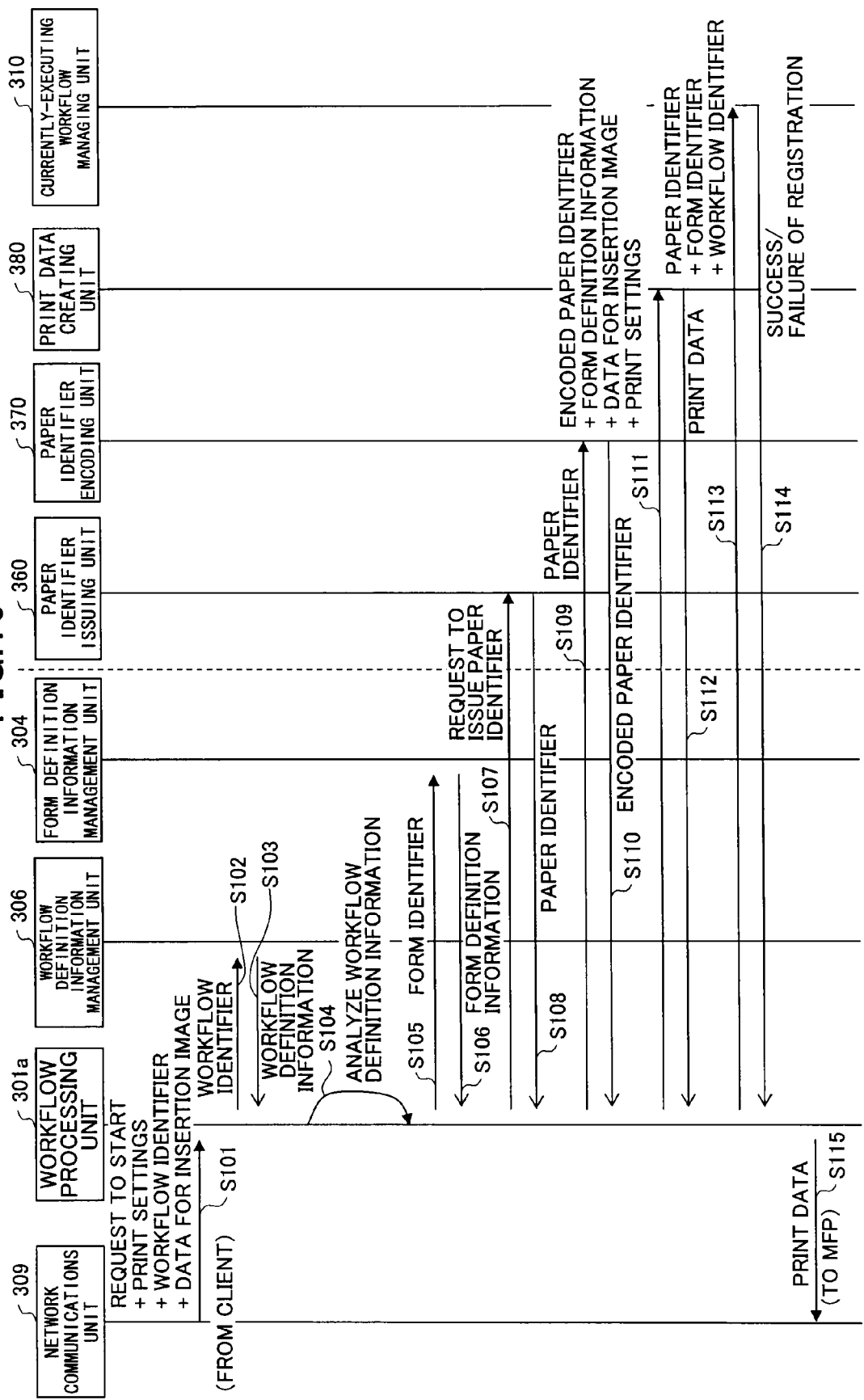

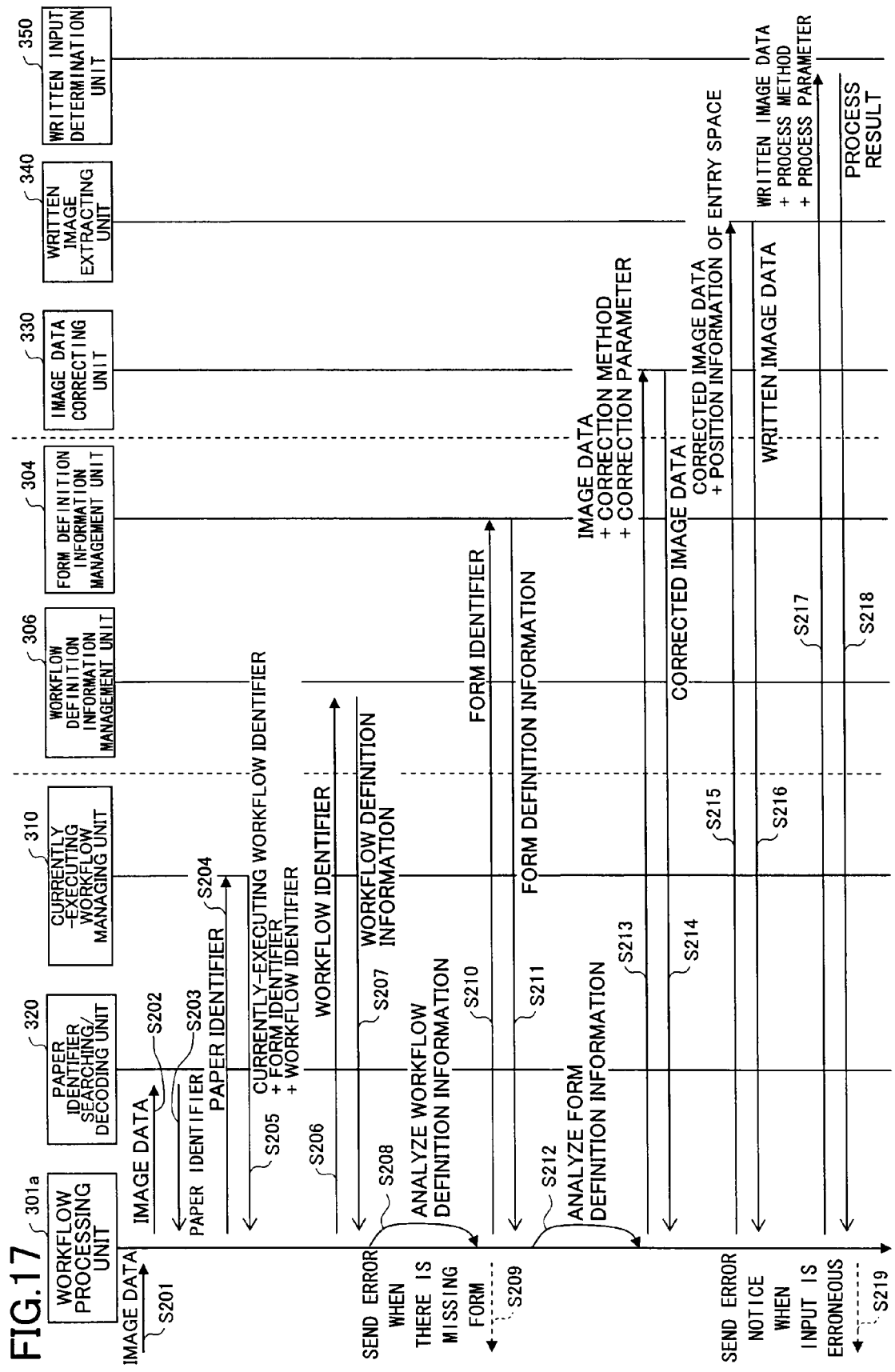

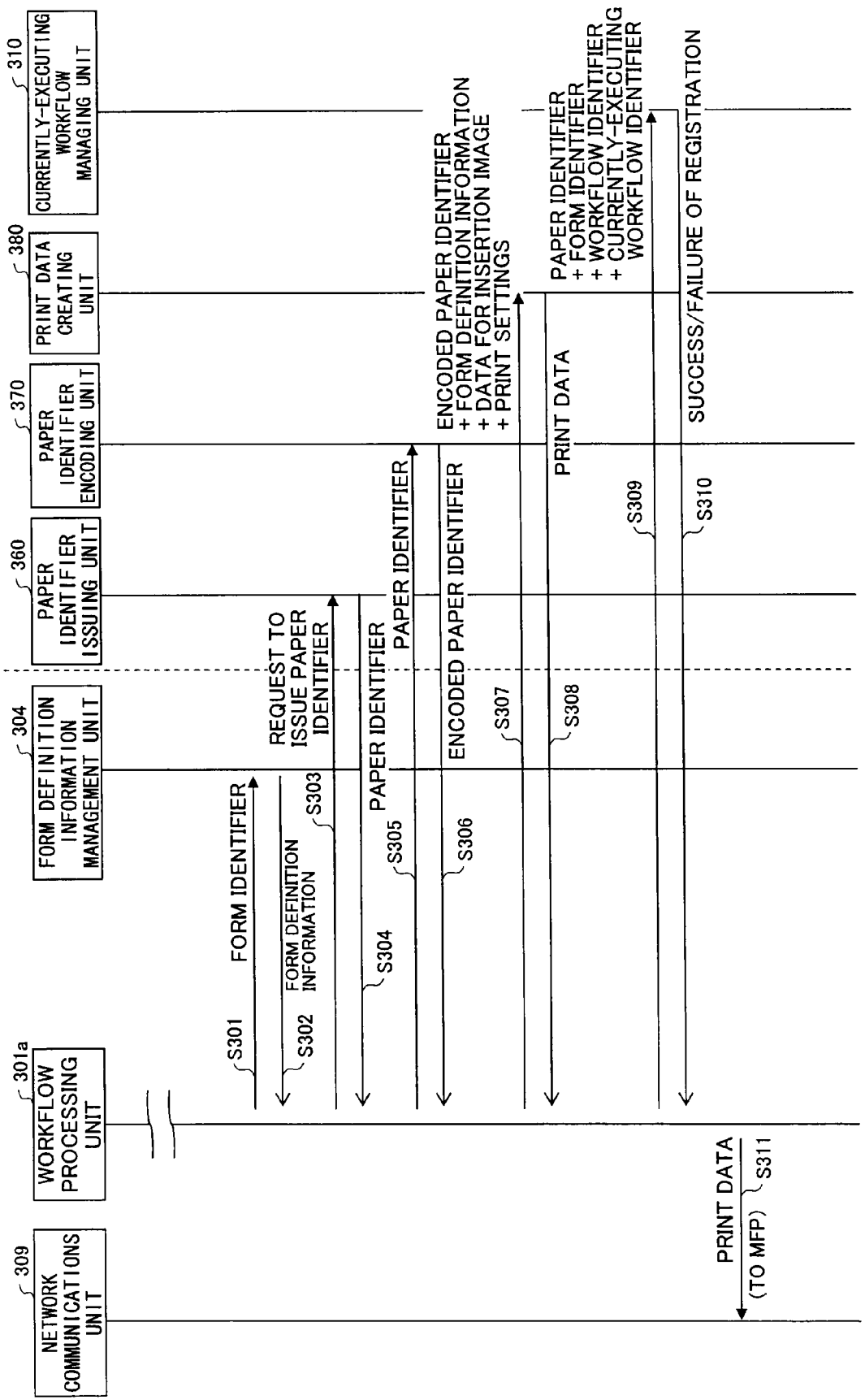

FORM PROCESSING DEVICE INCLUDING A WRITTEN IMAGE EXTRACTION DEVICE

BACKGROUND OF THE INVENTION

1. Field of the Invention

The present invention relates to a document processing device and a document processing method.

2. Description of the Related Art

Conventionally, there have been document processing devices for acquiring information that has been written into a form on a medium ("medium with form") and processing the acquired information. For example, Japanese Laid-Open Patent Application No. 2006-155551 (Patent Document 1) discloses a technology of a data processing device with which the type of form can be easily detected as follows. That is, contents of a process performed for scanning a form according to a user's instruction are associated, as attached information, with image data obtained by the scanning operation.

Furthermore, for example, Japanese Laid-Open Patent Application No. 2005-234790 (Patent Document 2) discloses a technology of a written input form processing system. A form includes a region where writing is to be input, which is different from other regions of the form. This different region is processed as a group element based on form definition information.

Furthermore, for example, Japanese Laid-Open Patent Application No. 2006-18492 (Patent Document 3) discloses a technology of a document processing device for associating coordination information of a series of processing that is performed on document information, with item information.

Incidentally, the "form" described in patent documents 1 through 3 corresponds to a "form" or a "medium with form" in embodiments of the present invention.

Patent Document 1: Japanese Laid-Open Patent Application No. 2006-155551

Patent Document 2: Japanese Laid-Open Patent Application No. 2005-234790

Patent Document 3: Japanese Laid-Open Patent Application No. 2006-18492

However, the technologies disclosed in patent documents 1 and 2 do not address a case of using a form that corresponds to each one of the processes (steps) included in a workflow definition. Generally, a single workflow definition includes plural processes, and a form corresponding to each process is defined. Furthermore, a post process is typically based on results of a previous process. In the technologies described in patent documents 1 and 2, the user is required to perform an operation for selecting a form for each process to be executed.

Furthermore, in the technology disclosed in patent document 3, when a single operator performs plural workflows at the same time, the operator is required to perform an operation for selecting a currently-executing workflow.

SUMMARY OF THE INVENTION

The present invention provides a document processing device and a document processing method in which one or more of the above-described disadvantages are eliminated.

A preferred embodiment of the present invention provides a document processing device and a document processing method with which a currently-executing workflow can be identified from image data obtained by scanning an image on a medium.

An embodiment of the present invention provides a document processing device for processing image data, including a medium identification information acquiring unit configured to acquire medium identification information from an image of the medium identification information included in the image data; a process information acquiring unit configured to acquire, based on the medium identification information, process information pertaining to a currently-executing process in a currently-executing workflow associated with the medium identification information; a form definition information acquiring unit configured to acquire, based on the process information pertaining to the currently-executing process, form definition information of a form corresponding to the currently-executing process; and a region image acquiring unit configured to acquire, based on the form definition information, a region image of a predetermined region in the image data, which predetermined region corresponds to an entry region in the form where written-input information is written in at the currently-executing process.

An embodiment of the present invention provides a document processing method of processing image data, including a medium identification information acquiring step of acquiring medium identification information from an image of the medium identification information included in the image data; a process information acquiring step of acquiring, based on the medium identification information, process information pertaining to a currently-executing process in a currently-executing workflow associated with the medium identification information; a form definition information acquiring step of acquiring, based on the process information pertaining to the currently-executing process, form definition information of a form corresponding to the currently-executing process; and a region image acquiring step of acquiring, based on the form definition information, a region image of a predetermined region in the image data, which predetermined region corresponds to an entry region in the form where written-input information is written in at the currently-executing process.

According to one embodiment of the present invention, a document processing device and a document processing method are provided, with which a currently-executing workflow can be identified from image data obtained by scanning an image on a medium.

BRIEF DESCRIPTION OF THE DRAWINGS

Other objects, features and advantages of the present invention will become more apparent from the following detailed description when read in conjunction with the accompanying drawings, in which:

FIG. 8 illustrates examples of attributes set for each entry region (part 1);

FIG. 9 illustrates examples of attributes set for each entry region (part 2);

FIG. 16 is a sequence diagram of an example of a process of generating and outputting a paper form of the first process of a workflow;

FIG. 17 is a sequence diagram of an example of a process performed on image data obtained by scanning a paper form with written input;

FIG. 18 is a sequence diagram of an example of a process of generating and outputting a paper form of a second process and onward in the same workflow.

DETAILED DESCRIPTION OF THE PREFERRED EMBODIMENTS

A description is given, with reference to the accompanying drawings, of an embodiment of the present invention.

First Embodiment

Figure 1:
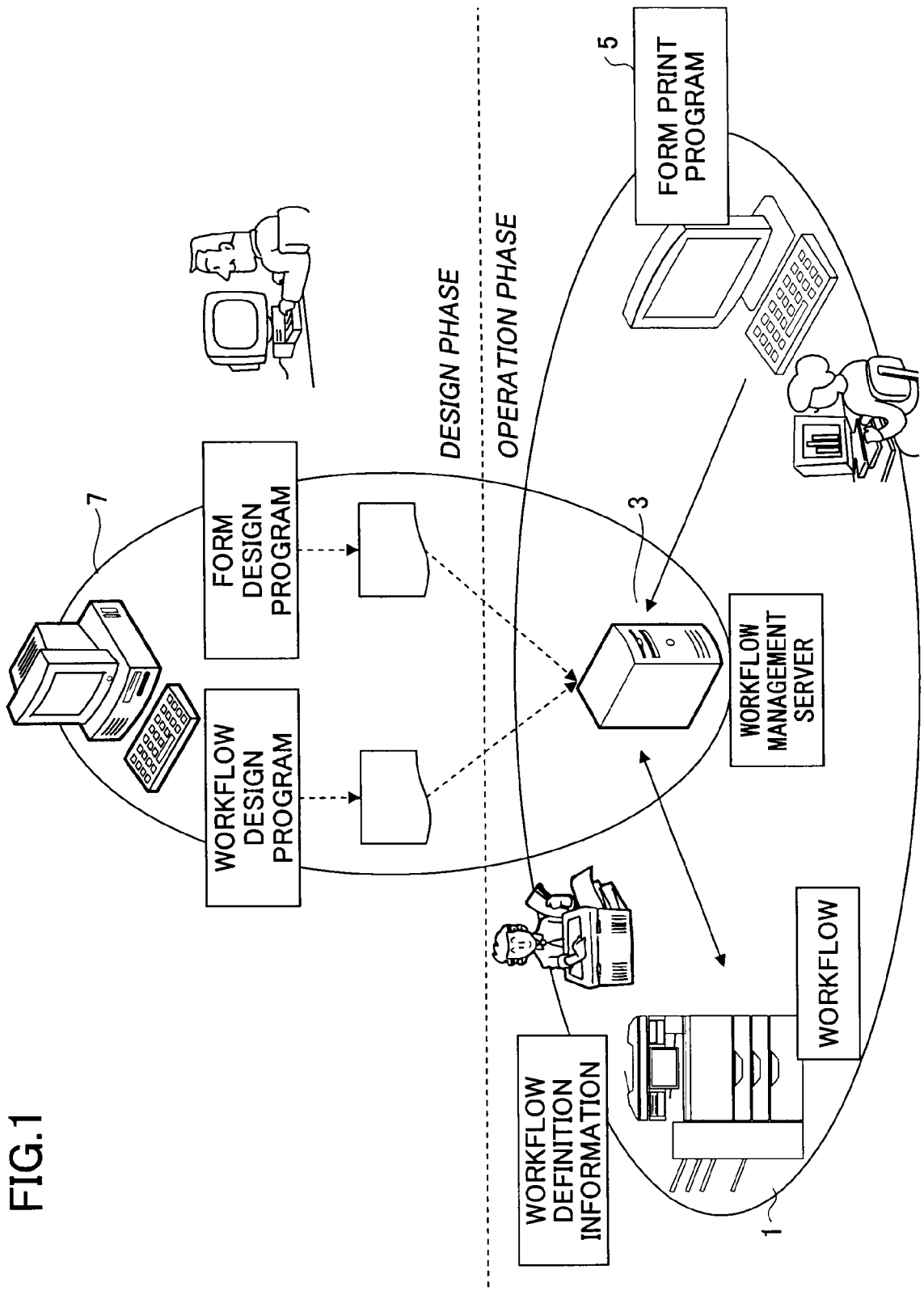
FIG. 1 is a schematic diagram of an example of a workflow system including a document processing device according to an embodiment of the present invention.

Schematic Diagram of an Example of a Workflow System Including a Document Processing Device According to an Embodiment of the Present Invention FIG. 1 is a schematic diagram of an example of a workflow system including a document processing device according to an embodiment of the present invention. The workflow system shown in FIG. 1 includes a "design phase" for designing a workflow and an "operation phase" for performing operations based on the designed workflow. In FIG. 1, the section above the dashed line is the "design phase" and the section under the dashed line is the "operation phase".

The workflow system shown in FIG. 1 includes a multi-function peripheral (MFP) 1, a workflow management server 3, an operation client 5, and a design client 7. The "design phase" includes the design client 7, and can also include the workflow management server 3. The "operation phase" includes the MFP 1, the workflow management server 3, and the operation client 5.

In the "design phase", in the design client 7, definitions of forms are created by executing a form design program, and a workflow definition that uses the forms is created by executing a workflow design program. A workflow definition includes processes (steps) included in a single workflow, the order of performing the processes, and form identification information of each form corresponding to one of the processes. Information on this workflow definition is referred to as "workflow definition information".

Form definition information that is the definition of the form and the workflow definition information that is the definition of the workflow, which are created in the design phase, are held by, for example, a storage unit (not shown) managed by the workflow management server 3.

In the "operation phase", in the operation client 5, a form to be used in a workflow is formed on a medium, and is printed out by executing a form print program. An operator corresponding to one of the processes of the workflow writes information in a medium with a form printed thereon (hereinafter, "paper form"). The paper form is scanned by the MFP 1 so that the written information can be acquired by the workflow management server 3. Accordingly, the workflow proceeds to the next process, and the workflow management server 3 instructs the MFP 1 to output a paper form to be used in the next process.

By alternately performing the operation of writing information in a paper form and the operation of scanning the paper form with the MFP1, progress is made in the processes of the workflow.

In the embodiments of the present invention, "written input" is not necessarily limited to handwriting. The information can be input with the use of a device such as a computer, or by any other method or means.

Figure 2:
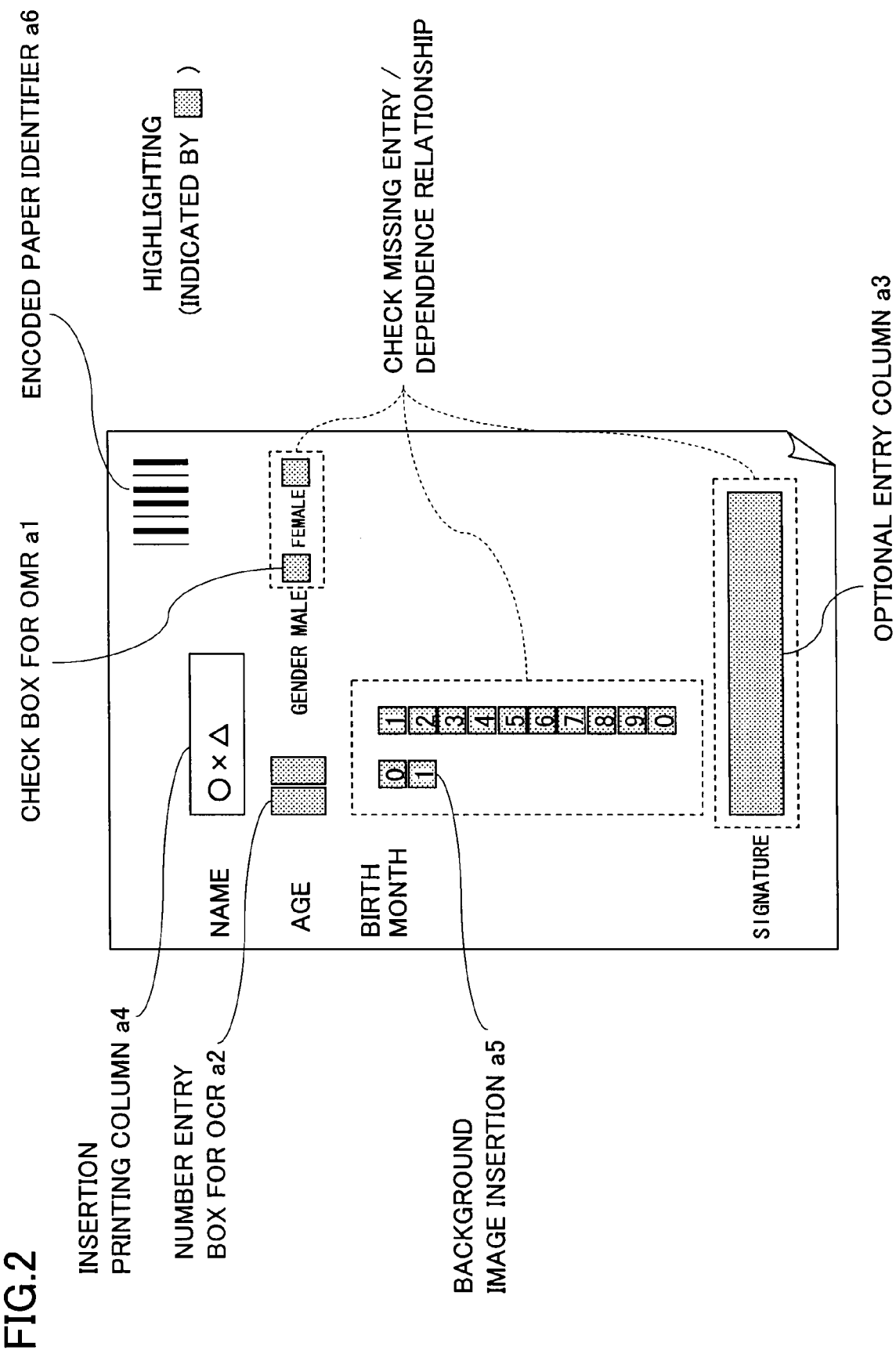
FIG. 2 illustrates an example of a paper form processed by a document processing device according to an embodiment of the present invention.

Example of a Paper Form Processed by a Document Processing Device According to an Embodiment of the Present Invention FIG. 2 illustrates an example of a paper form processed by a document processing device according to an embodiment of the present invention. The paper form shown in FIG. 2 includes check boxes for OMR a1, number entry boxes for OCR a2, an optional entry column a3, an insertion printing column a4, a background image insertion a5, and an encoded paper identifier a6.

In the paper form shown in FIG. 2, the regions where writing is to be input at corresponding processes (hereinafter, "entry regions") are highlighted. Thus, the entry regions in the form can be recognized more easily by the workflow operator compared to the case of a toneless form. In FIG. 2, the entry regions are highlighted; however, an embodiment of the present invention is not limited thereto. For example, the region can be accentuated by surrounding it with an image of a thick frame. Furthermore, if the paper form is a color image, the region can be highlighted with a different color.

The check boxes for OMR a1 are entry regions for selecting the gender, and are subjected to an OMR process. In this case, information indicating "male" or "female" is acquired based on the written input. The entry regions for selecting the birth month are also check boxes for OMR. In this case, the number of each digit is output based on the ticked check box.

More specifically, by an OMR process, a tick mark written in by the workflow operator is acquired from the entry region as information indicating presence/absence of a tick mark. Furthermore, the tick mark can be converted into information representing a number or text data. By converting a tick mark written in by a workflow operator into information that is processable by a computer as described above, processes such as data aggregation can be facilitated.

An image written in the number entry box for OCR a2 is subjected to a character recognition process. In FIG. 2, one number entry box for OCR a2 is provided for each digit representing an age. This facilitates the operation of aggregating the data that are output from this workflow system. The OCR process can be performed on any type of character other than numbers. However, in order to enhance the precision of the character recognition process, it is preferable to limit the type of characters to be written into the entry region, and to limit the number of characters to be written into each entry region. For example, the number of characters to be written into each entry region is preferably limited to one character.

The optional entry column a3 is not limited to writing in a tick mark or a number. An arbitrary character or figure can be written in this entry region. In FIG. 2, the optional entry column a3 is provided at the lowermost part as a signature space. The information written in this entry region is saved as an image.

The insertion printing column a4 is for combining an image with the paper form according to an instruction given by the operator initiating a workflow or a process of the workflow. In this region, a character string generated by a printing tool operated by the operator or data acquired from a DB (not shown) are converted into an image having a predetermined format of a character string, an image, a barcode, etc., and the image is combined with the paper form.

In FIG. 2, the insertion printing column a4, which is a name column, is an insertion printing region. Form definition information does not include an image corresponding to this region. Accordingly, when a paper form is output, the operator inputs a name so that a character string is combined with the form image in this region. The operator can input the name with a keyboard of the operation client 5. Alternatively, candidate names can be displayed when a form printing program is executed, and the operator can select one of the names. The background image insertion a5 is a region for combining an image representing a "month" with the paper form.

The encoded paper identifier a6 is an identifier for identifying the paper form. In the example shown in FIG. 2, the encoded paper identifier a6 is embedded as an encoded two-dimensional symbol. Each paper form can be identified by acquiring and decoding an image of this two-dimensional symbol and extracting information included in the identifier.

In the paper form of FIG. 2, an attribute can be added to each entry region. Examples of the attribute are a mandatory entry attribute indicating whether writing input is mandatory for the corresponding entry region, a condition for the mandatory entry attribute to be valid, and an attribute representing a dependence relationship between different entry regions. More specifically, there is an attribute indicating "exclusive selection" where only one check box can be selected among different boxes or an attribute indicating "plural selection" where plural check boxes can be selected from among different boxes.

In FIG. 2, for example, an attribute for checking a missing entry can be added to the lowermost signature space. An attribute of a dependence relationship between the boxes, which indicates that the boxes are subjected to exclusive selection, can be added to the gender selection check boxes. An attribute of a dependence relationship between the boxes, which indicates that a month corresponding to 13 or more cannot be selected, can be added to the birth month selection boxes. After the paper form is scanned by the MFP 1, it can be confirmed whether the dependence relationship between different entry regions is satisfied based on the attributes, so that the validity of the written entries can be determined.

Figure 3:
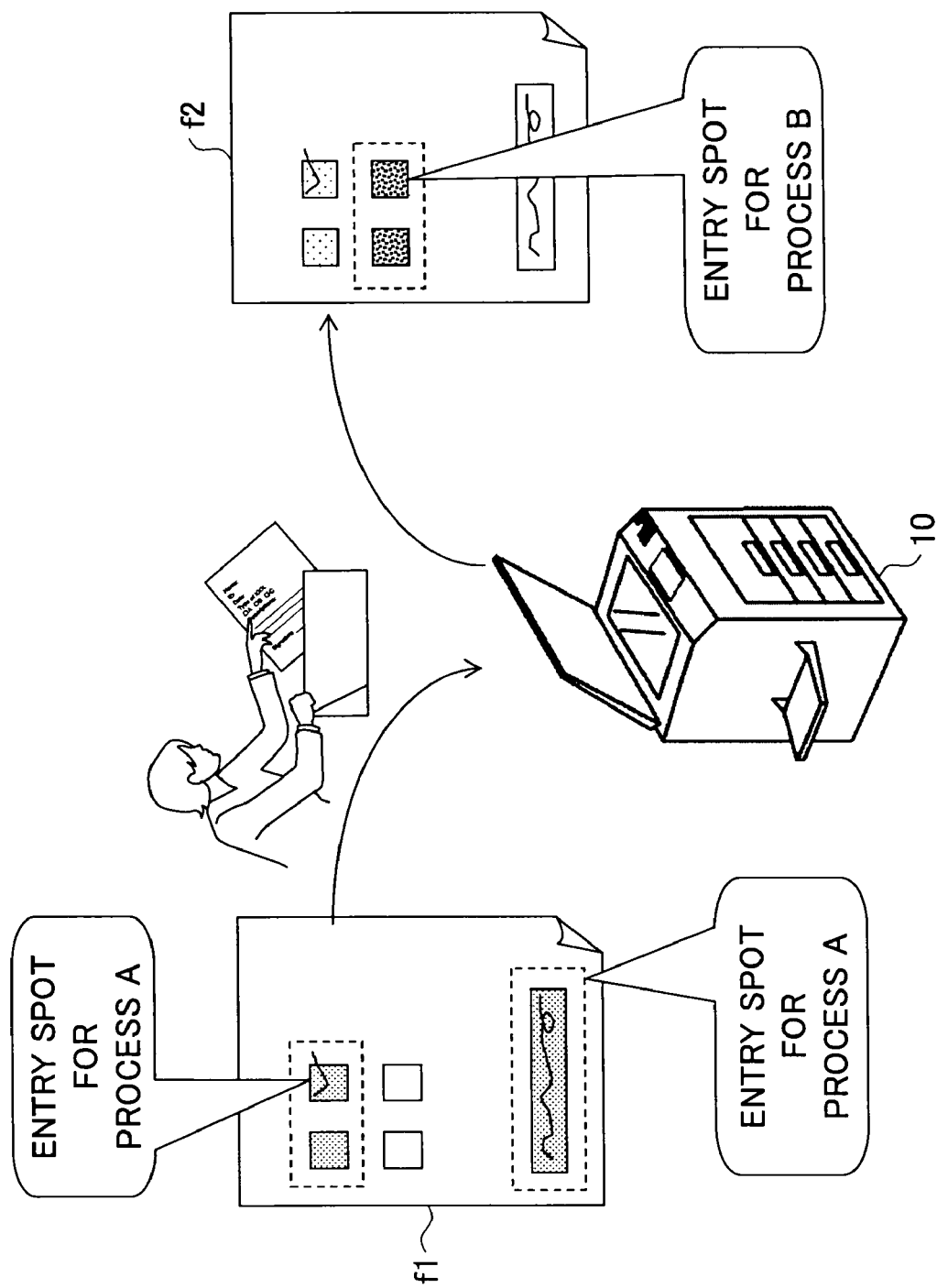
FIG. 3 is a diagram for describing that the paper form corresponding to each process is output.
Figure 4:
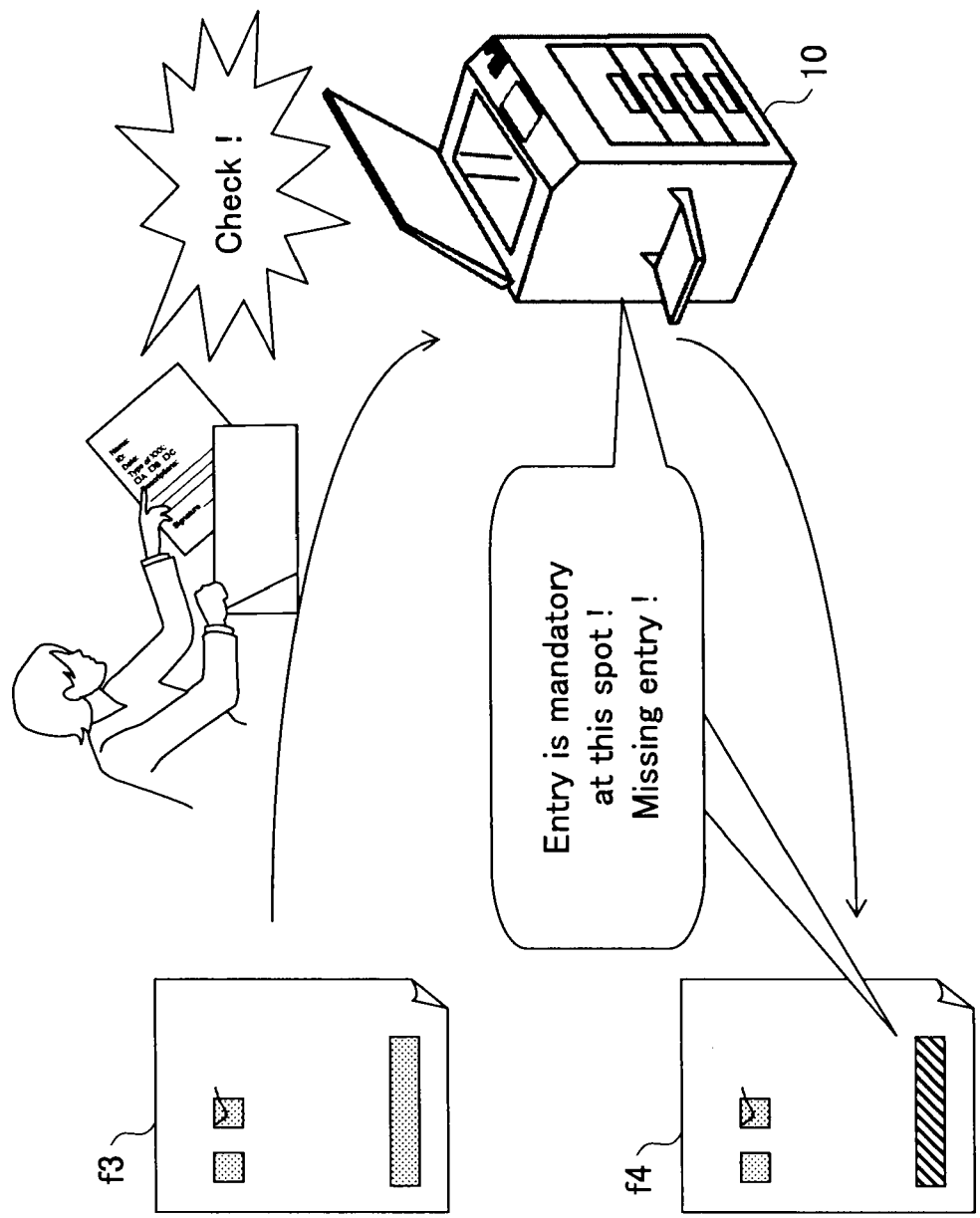
FIG. 4 illustrates an example of determining validity based on an attribute of an entry region in the paper form.
Figure 5:
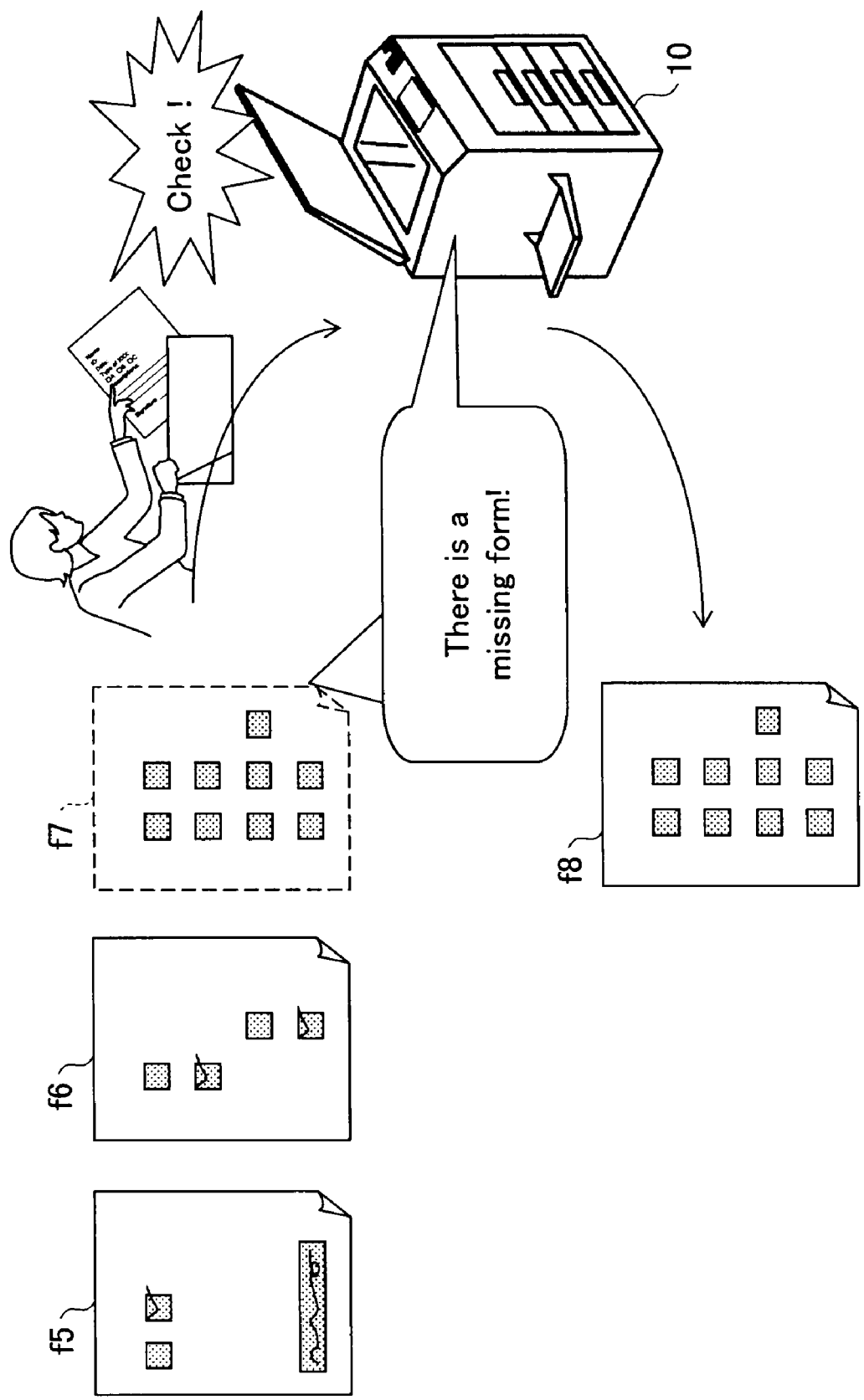
FIG. 5 illustrates an example of determining validity in a process using a different paper form.

Description of a Workflow Which Uses a Paper form Generated by a Document Processing Device According to an Embodiment of the Present Invention FIGS. 3 through 5 are diagrams for describing the workflow which uses a paper form generated by a document processing device according to an embodiment of the present invention. FIG. 3 is a diagram for describing that the paper form corresponding to each process is output.

In FIG. 3, in a paper form f1 used in a process A, the two entry regions are highlighted where writing is to be input in the process A. The operator of the process A inputs writing in the paper form f1. Then, an MFP 10 scans the paper form f1, thereby processing image data that are scanned and acquired by the document processing device according to an embodiment of the present invention.

More specifically, based on an attribute for each entry region, it is determined whether the form is valid in terms of missing entries, exclusion selection, plural selection, etc. When the paper form f1 is determined as being valid, a paper form f2 of a next process B is output.

The written input is determined as "valid" when the written input satisfies a condition that is specified based on an attribute defined by form definition information for each entry region included in the form. If this condition is not satisfied, the written input is determined as "invalid".

Accordingly, it is possible to prevent so-called "manual reverse". That is, when there is an erroneous entry in a form of a previous process, the error is confirmed in a post process, and the operator executing the post process sends a notice to the operator who executed the previous process.

The paper form f2 includes an image written in the process A or information corresponding to such an image. Furthermore, entry regions where writing is to be input in the process B are highlighted so that they are distinguished from the other regions.

The paper form f2 can be output by the document processing device according to an embodiment of the present invention, when the process for the paper form f1 has ended. Alternatively, the paper form f2 can be output when the operator initiating the process B inputs an instruction from, for example, the operation client 5. In the workflow that uses the document processing device according to an embodiment of the present invention, at least one form is associated with each process. In a process with which plural forms are associated, the validity of each entry region is determined for all of the paper forms.

For process B onward, each of the operators of the processes in the workflow inputs writing in a new paper form that is printed out, and causes the MFP 10 to scan the paper form. The same process is repeated until the workflow ends.

Example of Determining Validity of Written Input with a Document Processing Device According to an Embodiment of the Present Invention FIGS. 4 and 5 are diagrams for describing examples of determining the validity of written input. FIG. 4 illustrates an example of determination based on an attribute of an entry region in the paper form. FIG. 5 illustrates an example of determination in a process using a different paper form.

In the example shown in FIG. 4, a paper form f3 in which writing has been input by an operator in a certain process is scanned by the MFP 10 so that the image data are processed. Accordingly, the validity of the written input is determined based on the attribute of each entry region. In the example shown in FIG. 4, in the paper form f3, there is an entry region that is determined has having a missing entry. Therefore, the MFP 10 outputs a paper form f4. In the paper form f4, the entry region which is determined as having a missing entry in the paper form f3 is highlighted.

The form can include an entry region where written input is mandatory, such as a signature space of the operator, an entry region where written input is mandatory when a predetermined condition is satisfied, or an entry region where written input is prohibited. For each entry region, an entry error is checked based on a predetermined entry rule to determine the validity of the written contents or whether written input is present. The predetermined entry rule is defined in the "design phase" for when the workflow design program is executed and the form is designed.

When the image data obtained by scanning the paper form are checked to determine whether there is an entry error, and an entry error is found, the image data are displayed on an operations panel of the MFP 10, or the paper form in which the entry error is indicated is printed out from the MFP 10. A new paper form required for correcting the entry error can be obtained when the operator presses a re-printing button displayed on the operations panel of the MFP 10. Accordingly, the MFP 10 outputs a blank paper form or a paper form having a blank space only in the region corresponding to the entry error.

In the example shown in FIG. 5, paper forms f5 and f6 in which writing has been input by an operator in a certain process are scanned by the MFP 10 so that the image data are processed. In the process illustrated in FIG. 5, plural paper forms are used. Accordingly, not only is the validity of the written input determined based on the attribute of each entry region, but the validity of the combination of the paper forms is also determined.

The process illustrated in FIG. 5 actually requires three paper forms f5 through f7. However, only two paper forms f5 and f6 are put in the MFP 10 by the operator. Therefore, the MFP 10 outputs a message notifying the operator that the paper form f7 is missing.

As described above, the combination of forms used in each process of the workflow is managed. Thus, when there is a missing form corresponding to image data obtained by a scanning operation, a notification to this effect is given to the operator of the workflow. Thus, it is possible to prevent the workflow from proceeding to the next process if there is a missing form that is supposed to be put in the MFP 10. Accordingly, so-called "manual reverse" can be prevented, so that the workflow proceeds efficiently.

The missing paper form can be printed out by having the operator press a re-printing button provided on the operations panel of the MFP 10.

Example of a Function Configuration in a Design Phase

Figure 6:
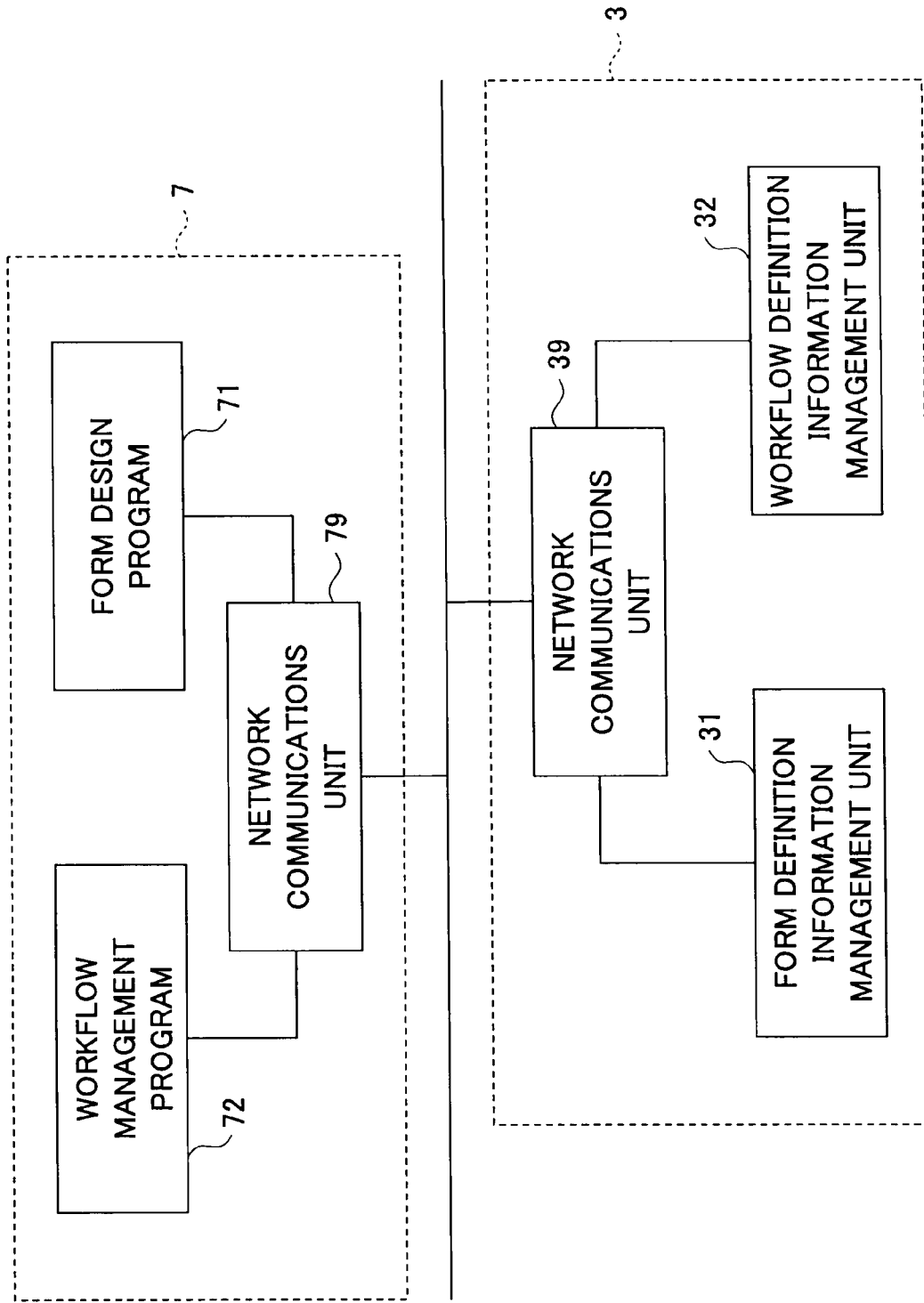
FIG. 6 is a block diagram of an example of a function configuration of a device for executing the processes in the "design phase"

FIG. 6 is a block diagram of an example of a functional configuration of devices for executing the processes in the "design phase". In FIG. 6, the workflow management server 3 and the design client 7 are connected via a network.

Example of a Functional Configuration of a Design Client

The design client 7 includes a CPU (not shown) for executing a form design program 71 and a workflow management program 72, and a network communications unit 79.

Example of Functions Realized by a Form Design Program

As the form design program 71 is executed, an interface is realized, which interface is used by the workflow designer for designing a form used in a workflow. More specifically, an interface for designing a new form or an interface for changing a form that has already been designed is realized.

In the case of an interface for changing a form that has already been designed, a list of form definition information items managed by the workflow management server 3 is acquired via the network communications unit 79, and the acquired list is displayed. The workflow designer selects, from the displayed list, a form definition information item to be used in the workflow. Based on the selected form definition information, a design page for a form is displayed. The workflow designer edits the form displayed on this page by adding or changing contents.

To design a form, it is possible to newly create a form from the beginning. Alternatively, an electronic document that has already been designed or image data obtained by scanning a form that has already been designed can be used as a base, and entry regions can be arranged on this base. Furthermore, the form definition information can include a method for correcting image data of a paper form with written input and correction parameters to be used for this correction.

Figure 7:
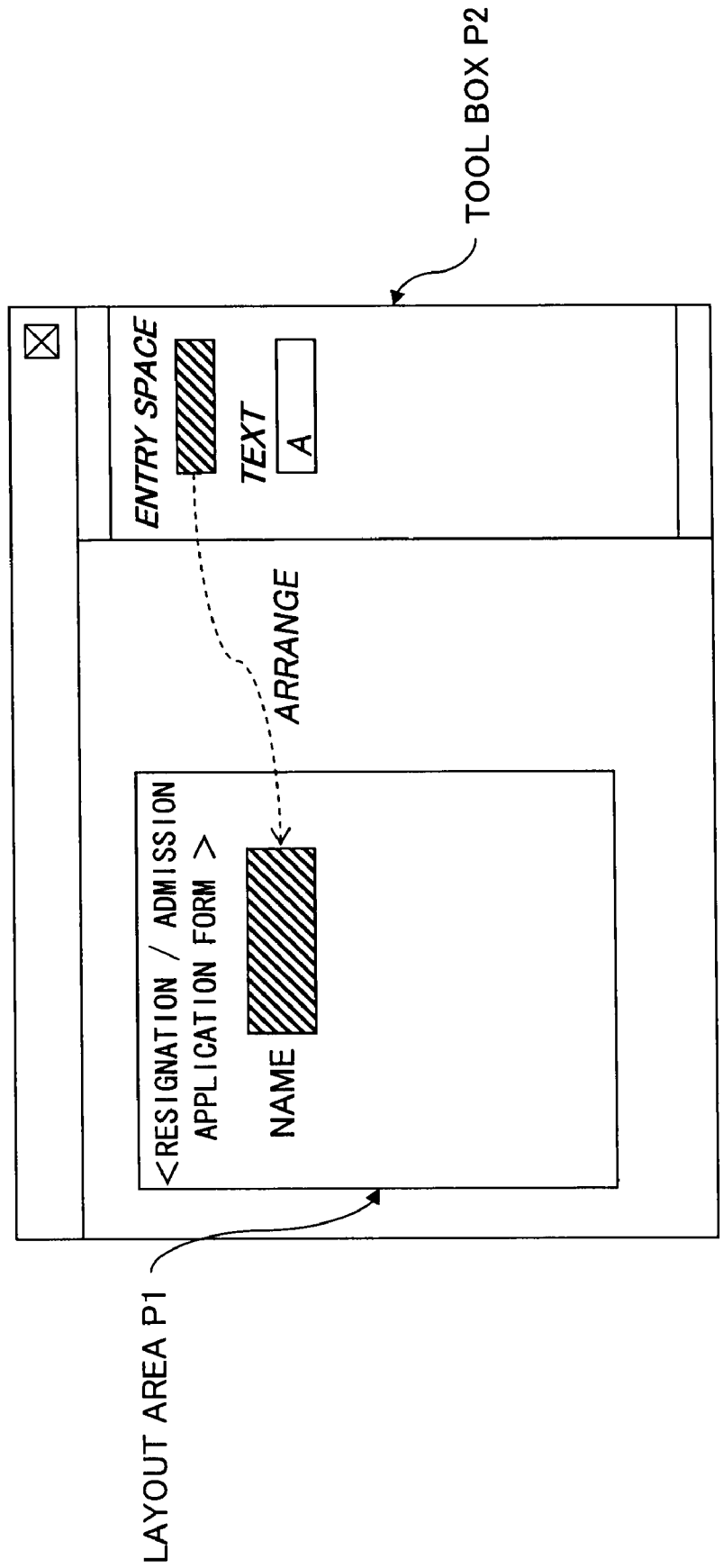
FIG. 7 illustrates an example of a page displayed by executing the form design program.

FIG. 7 illustrates an example of a page displayed by executing the form design program 71. The page shown in FIG. 7 includes a layout area P1 and a tool box P2. The layout area P1 is a region for creating the layout of the form. The tool box P2 includes entry regions to be arranged in the form or character string objects.

The workflow designer inputs an instruction from an input unit (not shown) to arrange entry regions or character strings in the layout area P1. Furthermore, an attribute is set for each of the entry regions arranged in the layout area P1.

Example of Attributes Set for Entry Regions

FIGS. 8 and 9 show examples of attributes to be set for each of the entry regions. Specifically, FIGS. 8 and 9 show lists of attributes to be set for a specified region, which is specified in the layout area P1 among the entry regions included in the form. For example, one of the attributes shown in FIG. 8 is selected and set for the specified region.

FIG. 9 is a list of mandatory entry attributes defining whether writing input is mandatory. These include an attribute indicating that written input is mandatory for the specified region and an attribute indicating that written input is mandatory for the specified region when a predetermined condition is satisfied.

Figure 10:
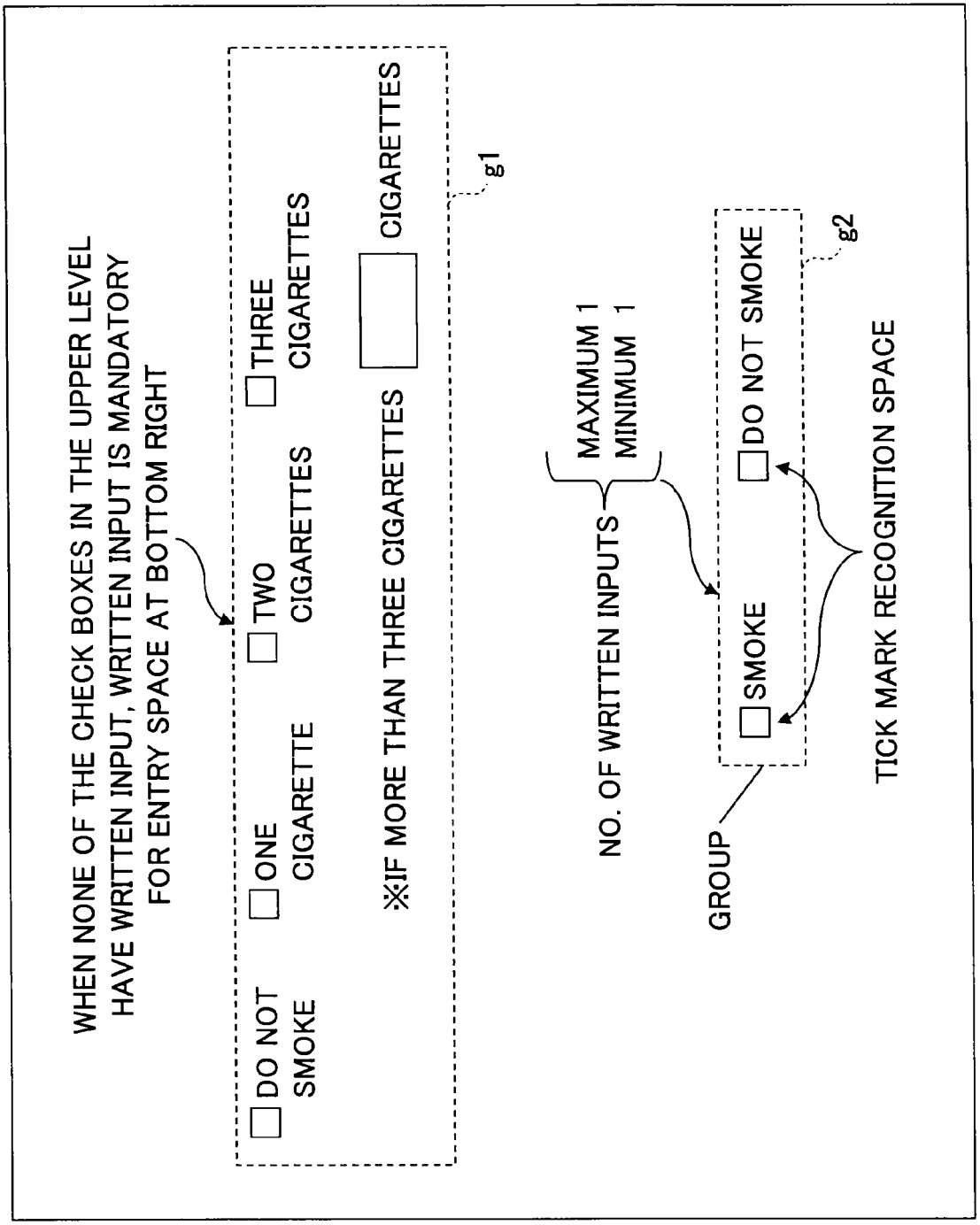
FIG. 10 is a diagram for describing a dependence relationship between different entry regions.

FIG. 10 is a diagram for describing how an attribute is set based on the dependence relationship between different entry regions. In FIG. 10, a group g1 includes plural entry regions. In this group, one of the entry regions has an attribute that requires written input according to whether another entry region has written input. More specifically, this mandatory entry attribute indicates that if none of the check boxes in the upper level of the group g1 have written input, written input is mandatory for the entry region in the bottom right corner.

In FIG. 10, g2 denotes a group including two entry regions, and only one of these entry regions can and must have written input. More specifically, the limitations in the number of written inputs in the group g2 can be specified as "maximum 1, minimum 1".

Example of a Function Realized by a Workflow Design Program

Referring back to FIG. 6, as the workflow management program 72 is executed, an interface is realized, which interface is used by the workflow designer for designing the workflow definition. Accordingly, a list of forms that have already been created is acquired via the network communications unit 79. The workflow designer inputs, from an input unit (not shown), an instruction to select forms for one workflow definition from the acquired list of forms, and an instruction to arrange these forms on a page displayed on a screen.

Furthermore, the workflow designer gives instructions to set the combinations of these forms and the order of printing these forms, i.e., the order of the processes in the workflow, thereby constructing a workflow definition. The combinations of the forms and the order of printing, which are set at this stage, are associated with identification information of the workflow, thereby forming workflow definition information.

Another function realized by the workflow management program 72 is outputting the workflow definition information to the workflow management server 3 via the network communications unit 79.

Figure 11:
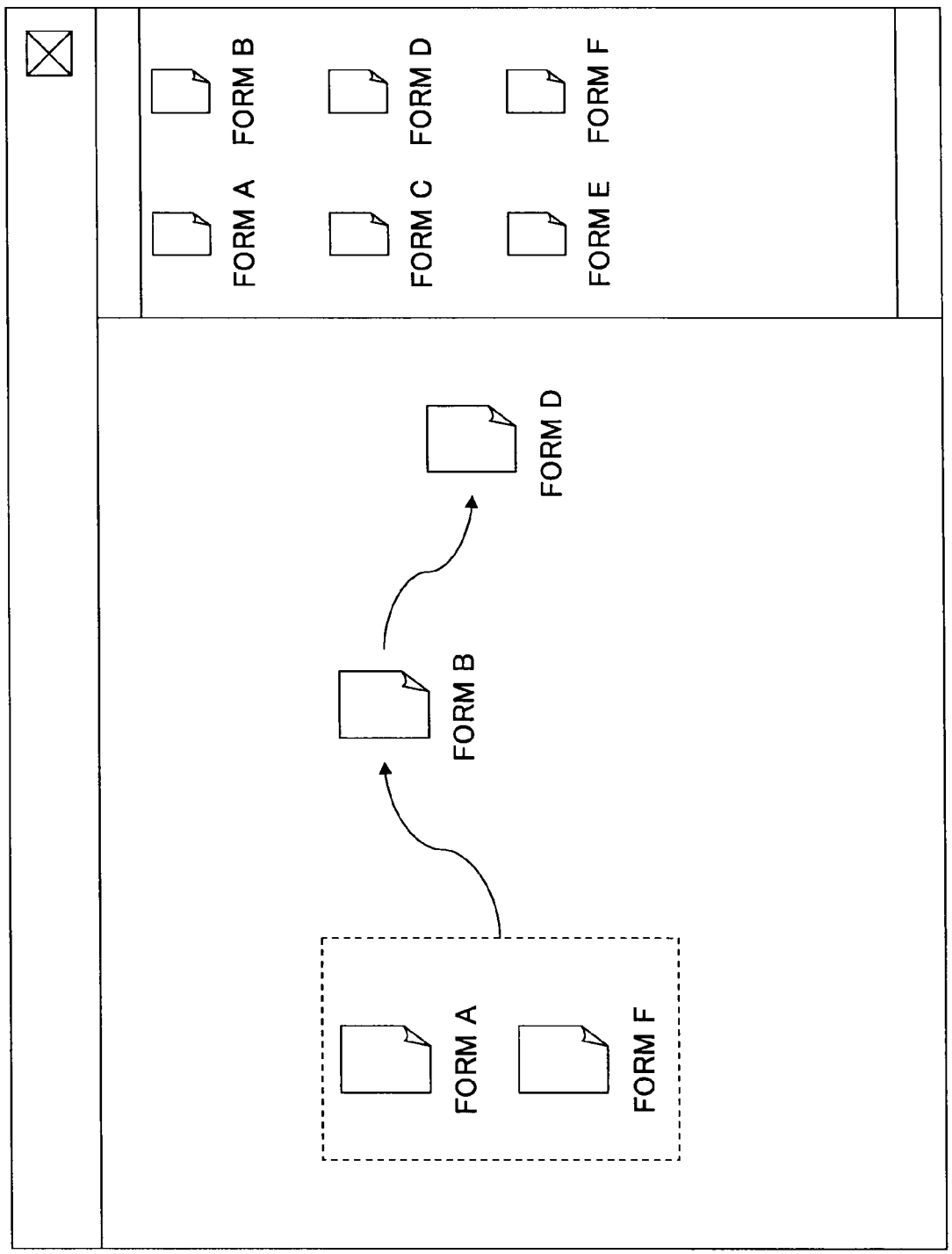
FIG. 11 illustrates an example of a page for associating a form with each process.

FIG. 11 illustrates an example of a design page displayed when the workflow management program 72 is executed. In the design page shown in FIG. 11, a list of forms is on the right side of the page. By selecting each icon of one of these forms and moving it to the left region of the screen with the mouse, the order of printing can be set, and the workflow definition information can be generated.

The workflow definition information includes, for example, form identifiers corresponding to form definition information of forms used in the workflow. Furthermore, the workflow design program also determines the association between written information of forms corresponding to different processes included in a single workflow definition.

More specifically, when the workflow designer performs a predetermined operation in the design page shown in FIG. 11, the written information acquired by identifying an image written into an entry region of a form A is associated with a predetermined region in a form B or a form D. Accordingly, when printing out the form B or the form D, an image generated from the written information is combined with the associated predetermined region. Other than associating the acquired written information with a predetermined region, it is also possible to associate an image of written input with a predetermined region. Accordingly, when printing out the form B or the form D, the image can be directly combined with the predetermined region, without requiring a process of generating an image based on written information.

Information pertaining to the association between data such as written information or an image and predetermined regions among different forms is included in the workflow definition information.

The following is another function realized by executing the form design program 71. That is, a request is output to acquire, from the workflow management server 3 via the network communications unit 79, a list of workflow definition information items of workflows that have already been designed and saved. Then, the acquired list of workflow definition information items is displayed. The workflow designer can select, with the use of an input unit (not shown), a workflow definition included in the displayed list. Based on this selection, a design page corresponding to the selected workflow definition can be displayed.

Referring back to FIG. 6, the network communications unit 79 is for performing communications with the workflow management server 3.

Description of a Function of a Workflow Management Server in a Design Phase

In FIG. 6, units in the workflow management server 3 for realizing the functions in the "design phase" include a form definition information management unit 31, a workflow definition information management unit 32, and a network communications unit 39.

The form definition information management unit 31 receives form definition information from the network communications unit 39. Furthermore, the form definition information management unit 31 issues a form identifier unique to each form definition information item so that the received form definition information can be uniquely identified. Then, the form definition information management unit 31 associates the received form definition information with the form identifiers. Moreover, the form definition information management unit 31 can save the associated information.

The form definition information management unit 31 returns the issued form identifiers, via the network communications unit 39, to the design client 7 that is the sender of the corresponding form definition information.

In a case where a form identifier that has already been issued is received, form definition information that corresponds to the form identifier is returned to the design client 7 via the network communications unit 39. When a request to acquire a list of the form definition information items is received, all of the form identifiers corresponding to the saved form definition information items are returned. When the request to acquire the list includes information for requesting form identifiers of a particular type of form, only the form identifiers of the particular type of form are returned, instead of returning all of the form identifiers.

The workflow definition information management unit 32 receives workflow definition information from the network communications unit 39. Furthermore, the workflow definition information management unit 32 issues a workflow identifier unique to each workflow definition information item so that the received workflow definition information can be uniquely identified. Then, the workflow definition information management unit 32 associates the received workflow definition information with the workflow identifiers. Moreover, the workflow definition information management unit 32 can save the associated information.

The workflow definition information management unit 32 returns the issued workflow identifiers, via the network communications unit 39, to the design client 7 that is the sender of the corresponding workflow definition information.

In a case where a workflow identifier that has already been issued is received, workflow definition information that corresponds to the workflow identifier is returned to the design client 7 via the network communications unit 39. When a request to acquire a list of the workflow definition information items is received, all of the workflow identifiers corresponding to the saved workflow definition information items are returned. When the request to acquire the list includes information for requesting workflow identifiers of a particular type of workflow, only the workflow identifiers of the particular type of workflow are returned, instead of returning all of the workflow identifiers.

The network communications unit 39 is for performing communications with the design client 7.

Figure 12:
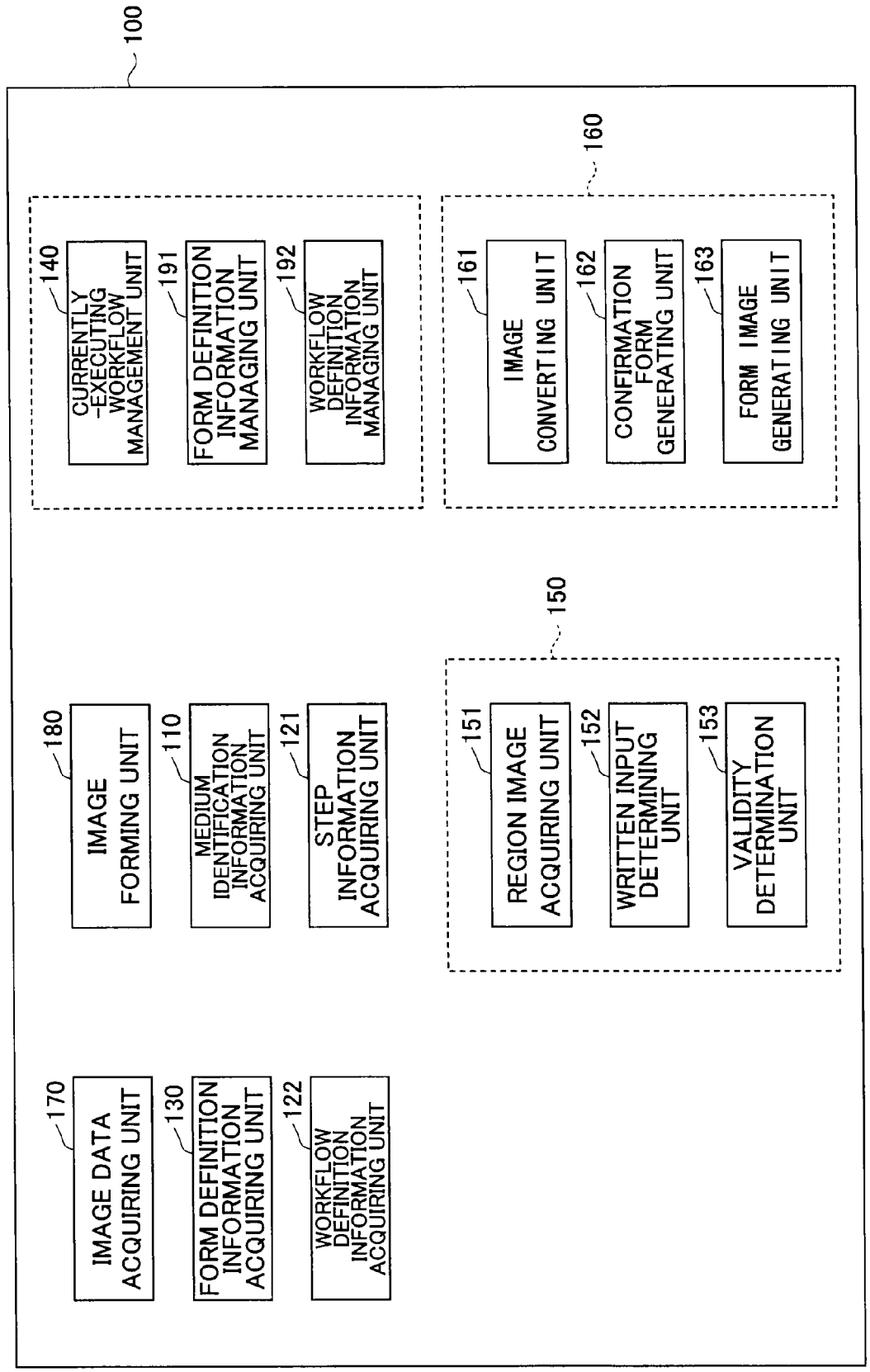
FIG. 12 illustrates an example of a function configuration of a document processing device according to an embodiment of the present invention.

Example of a Functional Configuration of a Document Processing Device According to an Embodiment of the Present Invention FIG. 12 illustrates an example of a functional configuration of a document processing device 100 according to an embodiment of the present invention. The document processing device 100 shown in FIG. 12 includes a medium identification information acquiring unit 110, a process information acquiring unit 121, a form definition information acquiring unit 130, and a region image acquiring unit 151. The document processing device 100 further includes a workflow definition information acquiring unit 122, a written input determining unit 152, a validity determination unit 153, an image generating unit 160, an image data acquiring unit 170, an image forming unit 180, a form definition information managing unit 191, or a workflow definition information managing unit 192.

The medium identification information acquiring unit 110 is for acquiring information for identifying the paper of a paper form from image data obtained by scanning the paper form. The medium identification information acquiring unit 110 acquires medium identification information formed on a medium. Furthermore, in a case where the medium identification information is formed on the medium as a code, the medium identification information acquiring unit 110 acquires an image of the code and decodes it to acquire identification information of the medium.

The process information acquiring unit 121 acquires a process of a currently-executing workflow corresponding to the medium identification information acquired by the medium identification information acquiring unit 110. The process information acquiring unit 121 outputs the medium identification information to a currently-executing workflow management unit 140 to acquire identification information of a process of a currently-executing workflow corresponding to the form formed on the medium. Furthermore, the process information acquiring unit 121 outputs the identification information of the process of the currently-executing workflow to the workflow definition information managing unit 192. Accordingly, the process information acquiring unit 121 can acquire the workflow definition information of the corresponding workflow definition, and can also acquire identification information of the form or identification information of the form definition information which is included in the acquired workflow definition information.

The workflow definition information acquiring unit 122 acquires corresponding workflow definition information based on the identification information of the workflow. The function of the workflow definition information acquiring unit 122 is used when a paper form is formed, for example.

The form definition information acquiring unit 130 acquires form definition information of a form corresponding to a process of the form that has been formed on the medium, based on the identification information of the form acquired by the process information acquiring unit 121 or the identification information of the form definition information. The form definition information acquiring unit 130 acquires the identification information of the form from the form definition information managing unit 191.

The currently-executing workflow management unit 140 is for managing a "currently-executing workflow", which has already been started but has not yet ended. The currently-executing workflow management unit 140 manages the currently-executing workflows by associating, with each currently-executing workflow, a currently-executing process and medium identification information of a medium having a form corresponding to the currently-executing process formed thereon. Accordingly, it is possible to perform a process of acquiring identification information of a medium from image data acquired by scanning an image on the medium, and acquiring a corresponding process of a currently-executing workflow.

The region image acquiring unit 151 acquires a region image of a region corresponding to a predetermined entry region from image data based on form definition information acquired by the form definition information acquiring unit 130. The region image acquiring unit 151 can be included in a region processing unit 150 together with the written input determining unit 152 and the validity determination unit 153.

The written input determining unit 152 makes a determination with respect to written input in an entry region corresponding to each region image acquired by the region image acquiring unit 151. More specifically, the determination with respect to written input means determining whether written input is present/absent in the entry region or determining the type of information written in the entry region.

Determining the type of information involves determining whether the written image is a "character", a "number", or a "symbol", or determining the type of information obtained by performing an OCR process or an OMR process on the written image. The written input determining unit 152 can determine the type of written information based on an attribute of each entry region defined by form definition information. For example, an OCR process can be performed on a region image of an entry region having an attribute indicating "character". An OMR process can be performed on a region image of an entry region that is defined by an attribute as being a check box.

Based on the determination made by the written input determining unit 152 as to whether written input is present or the type of written information, and also based on the attribute of the corresponding entry region, the validity determination unit 153 determines the validity of the written input. For example, the validity determination unit 153 determines whether written input is present in an entry region having a mandatory entry attribute, or determines the validity of the dependence relationship between different entry regions included in a group.

The image generating unit 160 is for generating an image of a form, and includes an image converting unit 161, a confirmation form generating unit 162, and a form image generating unit 163.

The image converting unit 161 is for converting a region image of an erroneous input region that is determined as being an entry region with invalid written input by the validity determination unit 153, into an image that is displayed in a highlighted manner with respect to the other entry regions. For example, the image converting unit 161 changes the background color of the region image of the erroneous input region into a color that can be distinguished from the background color of the entire form. By changing the background color to a color that can be distinguished from the background color of the entire form, a highlighted image can be generated. The image converting unit 161 can also generate an image that is highlighted with respect to the other regions by surrounding the region image of the erroneous input region with a thick frame of a predetermined color.

The confirmation form generating unit 162 is for generating an image of a "confirmation form" in which an image of a form is combined with an image converted by the image converting unit 161. The confirmation form generating unit 162 combines the converted region image of the erroneous input region with the form image at a position corresponding to the erroneous input region, based on form definition information.

The form image generating unit 163 is for generating an image of a form based on form definition information. An image of a form without any written input is referred to as a "form base".

The form definition information managing unit 191 is for managing the form definition information corresponding to a process included in the workflow definition. The form definition information managing unit 191 can hold form definition information.

The workflow definition information managing unit 192 is for managing the processes included in each workflow definition and the order of executing the processes, and also for managing workflow definition information that is associated with identification information of a form corresponding to each process. The workflow definition information managing unit 192 can also hold workflow definition information.

The image data acquiring unit 170 is for acquiring image data obtained by scanning the paper form. For example, the image data acquiring unit 170 acquires image data obtained by scanning an image with an image scanning unit (not shown). Furthermore, for example, the image data acquiring unit 170 can acquire image data of an image scanned by an MFP that is connected via a network.

The image forming unit 180 forms an image generated by the image generating unit 160 onto a medium, and outputs the image.

Figure 13:
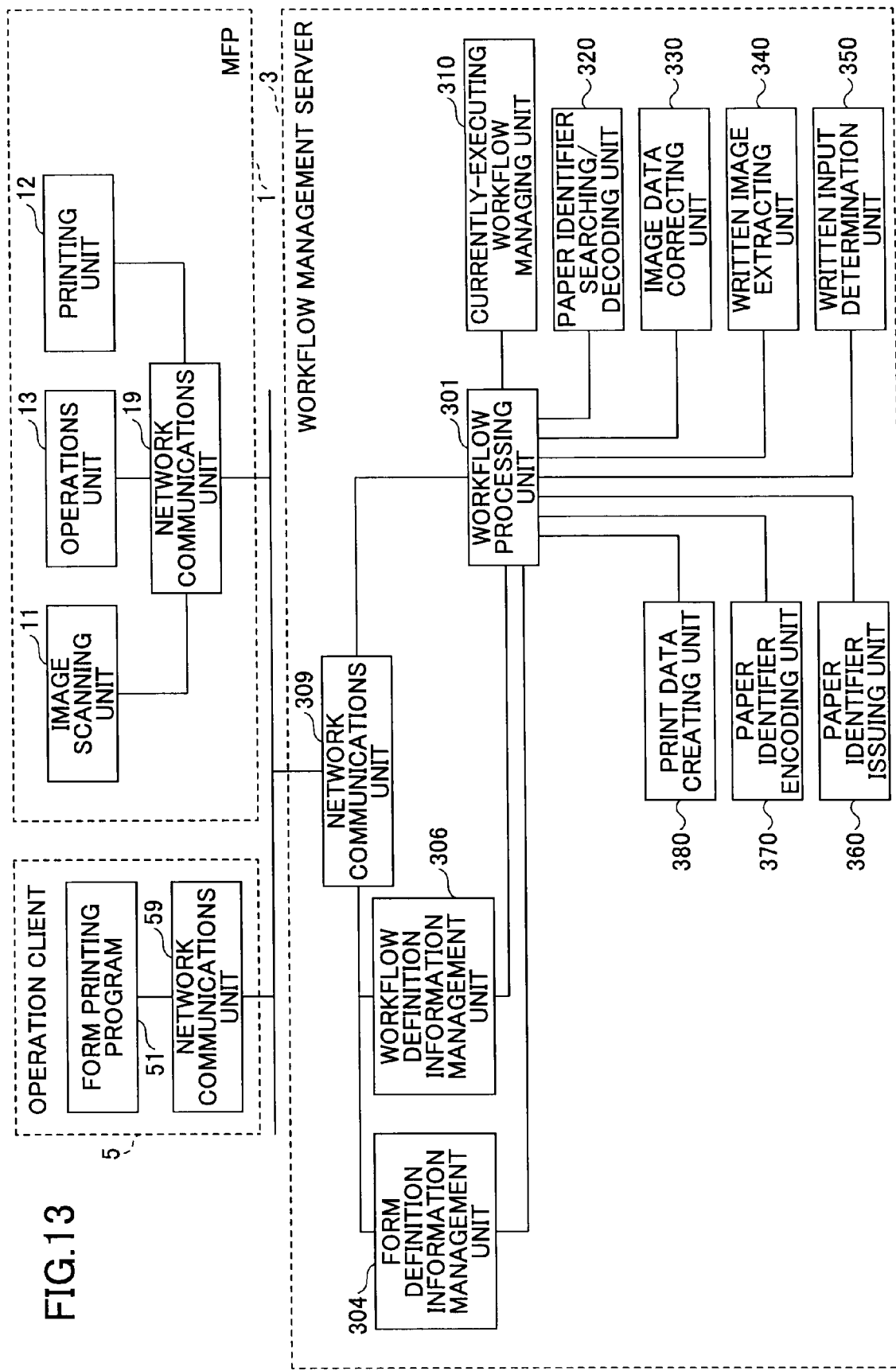
FIG. 13 illustrates an example of a function configuration of a workflow system realized by a document processing device according to an embodiment of the present invention.

Example of a Functional Configuration of a Document Processing Device According to an Embodiment of the Present Invention FIG. 13 illustrates an example of a functional configuration of a document processing device according to an embodiment of the present invention. The workflow management server 3 shown in FIG. 13 that is a document processing device is connected to the MFP 1 and the operation client 5.

In FIG. 13, a document processing device according to an embodiment of the present invention is the workflow management server 3. However, an embodiment of the present invention is not limited to the example shown in FIG. 13. For example, the document processing device can be an MFP that is one of the clients in a network.

The workflow management server 3 includes, for example, a workflow processing unit 301, a form definition information management unit 304, a workflow definition information management unit 306, and a network communications unit 309.

The workflow processing unit 301 is for proceeding with the workflow by controlling its functions based on predetermined workflow definition information, in response to requests received from the operation client 5 or the MFP 1 via the network communications unit 309.

The workflow processing unit 301 includes, for example, a currently-executing workflow managing unit 310, a paper identifier searching/decoding unit 320, an image data correcting unit 330, a written image extracting unit 340, a written input determination unit 350, a paper identifier issuing unit 360, a paper identifier encoding unit 370, and a print data creating unit 380.

The currently-executing workflow managing unit 310 is for associating and managing paper identifiers, form identifiers, workflow identifiers, processes in a workflow, and currently-executing workflow identifiers.

The paper identifier is identification information for identifying a paper sheet which is a medium with a predetermined form. The form identifier is identification information for identifying a form. The workflow identifier is identification information for identifying a workflow. A currently-executing workflow identifier is identification information for identifying a currently-executing workflow. These identifiers are preferably uniquely defined.

When a paper identifier, a form identifier, and a workflow identifier are received from the workflow processing unit 301, the currently-executing workflow managing unit 310 issues a new currently-executing workflow identifier. This new currently-executing workflow identifier is issued so as not to coincide with another currently-executing workflow identifier managed by the currently-executing workflow managing unit 310. The currently-executing workflow managing unit 310 associates the currently-executing workflow identifier that it has issued with the paper identifier, the form identifier, and the workflow identifier received from the workflow processing unit 301, and manages them.

When a paper identifier is received once again the currently-executing workflow managing unit 310 outputs the form identifier, the workflow identifier, and the currently-executing workflow identifier, which are associated with the received paper identifier, and the processes of the currently-executing workflow.

The paper identifier searching/decoding unit 320 searches for an encoded paper identifier in the image data. When an encoded paper identifier is found, the paper identifier searching/decoding unit 320 decodes the paper identifier, acquires contents of the paper identifier, and outputs the contents. When an encoded paper identifier is not found the paper identifier searching/decoding unit 320 outputs a notification to that effect.

The image data correcting unit 330 receives image data, a correction method, and a correction parameter, and corrects the tilt and the distortion in the entire image data that have been received. Accordingly, it is possible to enhance the precision in extracting an image of the written input performed by the written image extracting unit 340.

The written image extracting unit 340 receives image data and information such as the position and the size of the entry region, and cuts out a region image from the entry region in the received image data. For each region image that has been cut out, a process is performed for removing a color according to a particular condition. The image from which the color has been removed is output. The following is an example of the process of removing a color according to a particular condition. For each pixel included in a region image, the brightness and the color saturation is calculated. If there is a pixel having a color whose brightness and/or color saturation exceeds a predetermined threshold, the pixel value of this pixel is replaced with the background color of the form. Accordingly, for example, frame lines in the form can be removed from the region image, so that the precision of the process performed by the written input determination unit 350 can be enhanced.

The written input determination unit 350 receives an image extracted by the written image extracting unit 340, a written input determination standard for the image, and process contents, and determines whether the received image meets the written input determination standard. If it meets the standard, the written input determination unit 350 executes a process according to the received process contents. The written input determination unit 350 returns the written input determination result and the process result to the workflow processing unit 301.

The written input determination standard is, for example, an attribute of each entry region defined by form definition information, or a determination standard based on such an attribute. The entry region may correspond to a "character" or a "symbol", or may have a mandatory entry attribute based on the dependence relationship between different entry regions.

The paper identifier issuing unit 360 issues a paper identifier for identifying the paper, in response to a request. This paper identifier is preferably issued so as to uniquely identify the paper.

The paper identifier encoding unit 370 receives the paper identifier and encodes the paper identifier as a machine-readable image. A machine-readable image is, for example, a two-dimensional barcode or a QR code.

The print data creating unit 380 receives the encoded paper identifier, superimposing positions on the form for combining the paper identifier with the form, form definition information, data to be inserted in the form, and the positions for inserting the data. Then, the print data creating unit 380 generates an image of the form, and superimposes the encoded paper identifier and the data to be inserted in the form in the respective superimposing positions. Accordingly, an image of the form to be printed out is created.

The form definition information management unit 304 manages the form definition information of the form corresponding to each process included in the workflow definition. Furthermore, the form definition information management unit 304 can hold form definition information.

The workflow definition information management unit 306 manages workflow definition information corresponding to each workflow definition. Furthermore, the workflow definition information management unit 306 can hold the workflow definition information.

The network communications unit 309 communicates with the operation client 5 or the MFP 1 connected thereto via the network.

The MFP 1 acquires image data obtained by scanning the paper form and outputs the image data to the workflow management server 3, or forms an image of the form generated by the workflow management server 3 on a medium and outputs the medium. The MFP 1 includes, for example, an image acquiring unit 11, a printing unit 12, an operations unit 13, and a network communications unit 19.

The image acquiring unit 11 acquires image data of an image obtained by scanning a paper form with written input, according to an instruction input by an operator. The printing unit 12 forms print data, which corresponds to image data on a received paper form, onto a medium according to a print setting included in the print data, and then outputs the medium.

The operations unit 13 includes an input unit to which an instruction is input by an operator and a display unit for displaying the state of the MFP 1 of another device connected via a network.

The network communications unit 19 performs communications with the workflow management server 3. Furthermore, the network communications unit 19 sends image data acquired by the image acquiring unit 11 to the workflow management server 3. Moreover, the network communications unit 19 receives image data of a paper form generated by the workflow management server 3 and outputs it to the printing unit 12.

The operation client 5 includes a CPU (not shown) for executing a form printing program 51, and a network communications unit 59. As the form printing program 51 is executed, an interface is realized for the workflow operator to print out a form used in the workflow. The network communications unit 59 is for performing communications with the workflow management server 3.

Example of a Page Displayed by Executing the Form Printing Program 51

Figure 14:
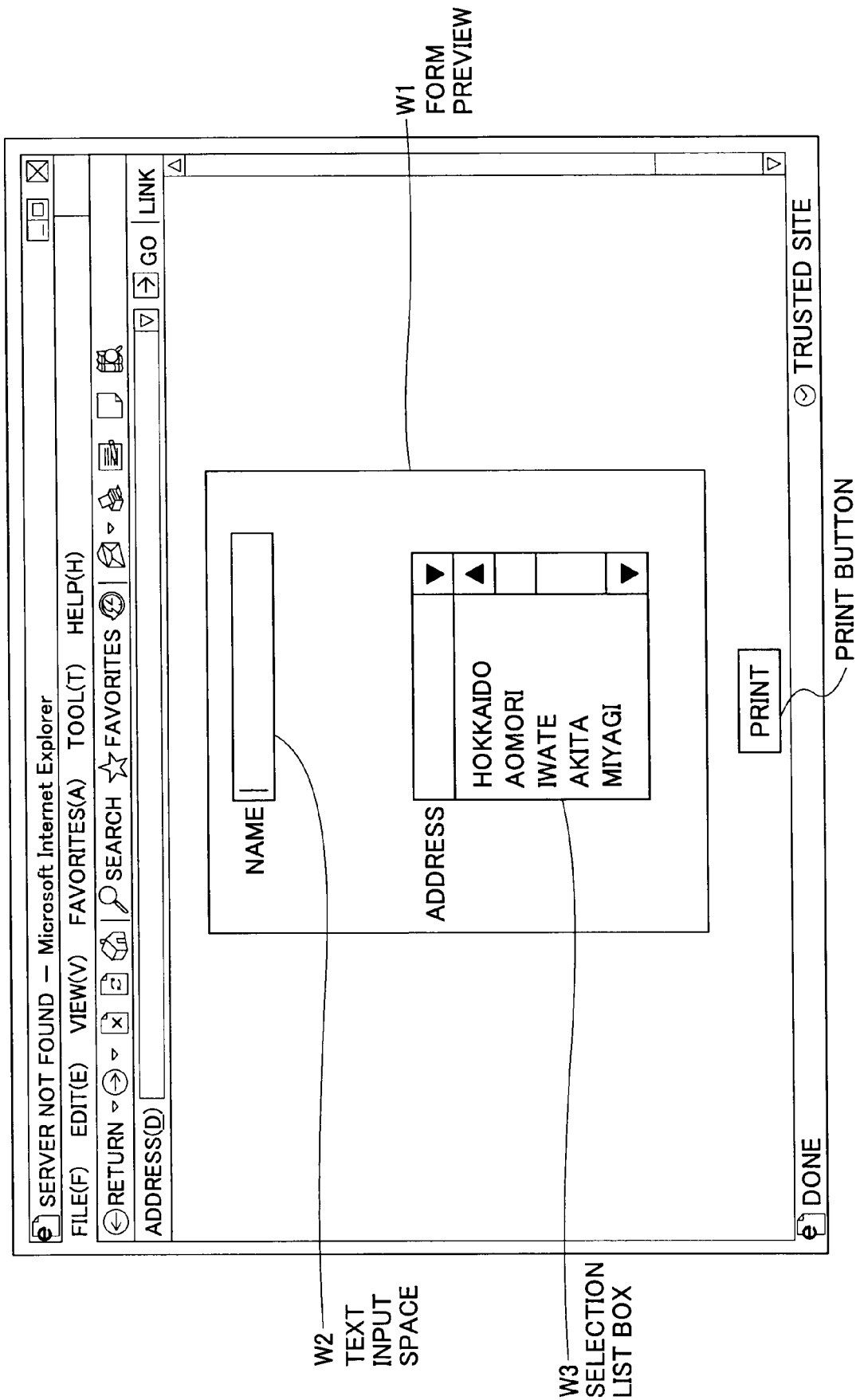
FIG. 14 is an example of a page displayed when a form printing program is executed.

FIG. 14 is an example of a page displayed on a display unit (not shown) controlled by the operation client 5, as the form printing program 51 is executed. By the function of the form printing program 51, a list of workflows is acquired via the network communications unit 59. A preview W1 of a form is displayed, which form is allocated to the first process of the workflow selected by the workflow operator.

The form preview W1 includes a text input space W2 and a selection space W3 which is a list box. The text input space W2 is for the workflow operator to input a character string. The list box selection space W3 is for the workflow operator to select one of the items shown in the list box.

When the workflow operator presses a print button included in the form preview W1 to select a printing instruction, the function realized by the form print program sends the form to be printed to the workflow management server 3 via the network communications unit 59. It is also possible to send, together with the form to be printed, the contents input to the text input space W2 or the contents selected with the list box selection space W3 to the workflow management server 3.

The instruction for printing can be given by another print instruction function of the operation client 5, without pressing the print button included in the preview W1.

The network communications unit 59 is for performing communications with the workflow management server 3.

Figures 15A, 15B:
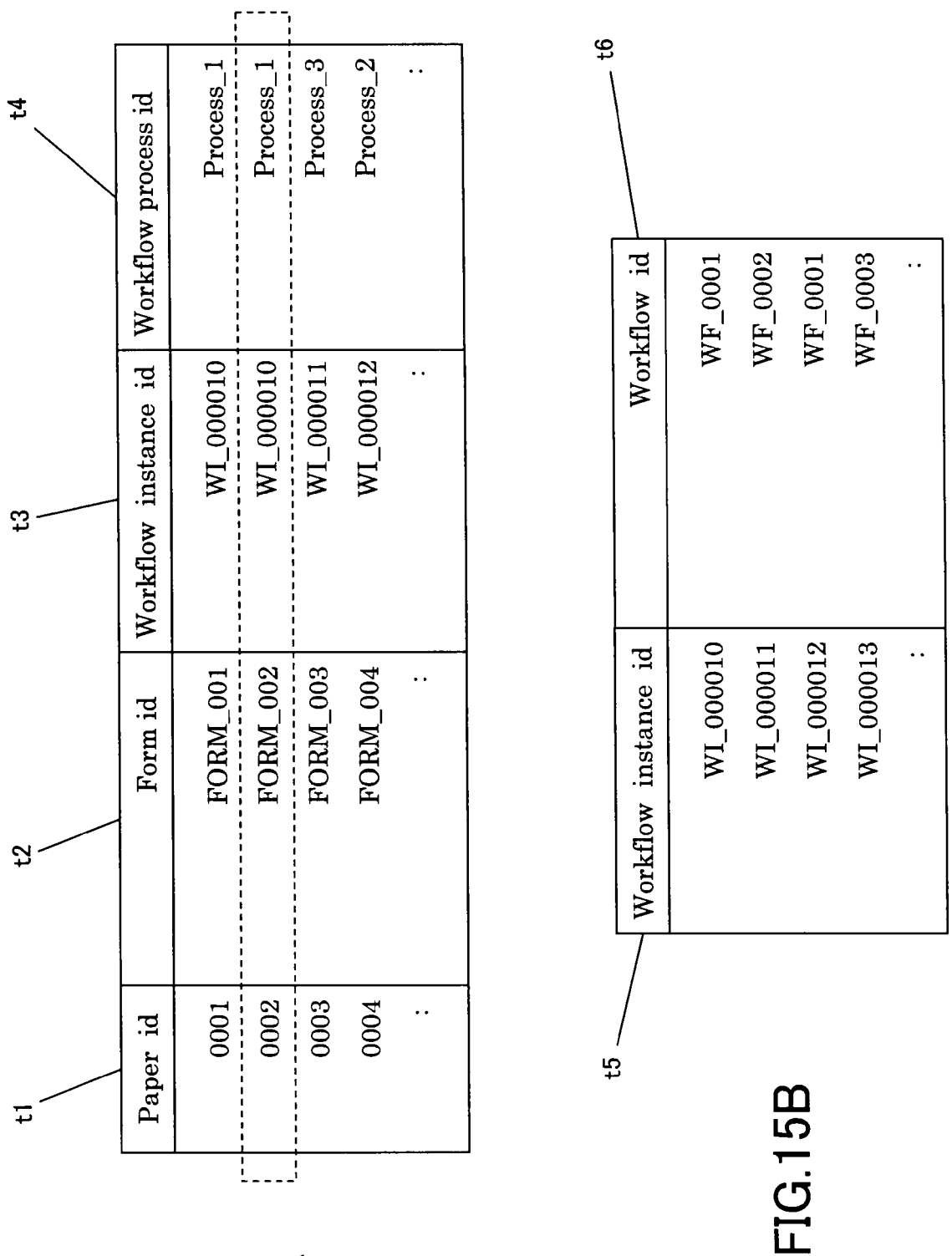
FIGS. 15A and 15B illustrate examples of information managed by a currently-executing workflow managing unit.

Example of Information Managed by a Currently-Executing Workflow Management Unit FIGS. 15A and 15B illustrate examples of management tables of information associated with each other by the currently-executing workflow managing unit 310. In FIG. 15A, paper identifiers t1, form identifiers t2, currently-executing workflow identifiers t3, and processes t4 of a workflow corresponding to forms indicated by the paper identifiers are associated with each other. In FIG. 15B, currently-executing workflow identifiers t5 and workflow identifiers t6 are associated with each other. When there is only one type of workflow being processed in one workflow system, the table shown in FIG. 15B can be omitted.

Example of Processes of Generating and Outputting Paper Form of First Process FIGS. 16 through 18 are sequence diagrams of examples of processes executed by a document processing device according to an embodiment of the present invention. A workflow processing unit 301a mentioned in FIGS. 16 through 18 corresponds to a main control unit (not shown) of the workflow processing unit 301.

FIG. 16 is a sequence diagram of an example of a process of generating and outputting a paper form of the first process of a workflow. In step S101 of FIG. 16, the network communications unit 309 outputs, to the workflow processing unit 301a, a request to start a workflow as well as settings for printing out a paper form, a workflow identifier, and image data of an insertion image. The data output at step S101 can be sent from the operation client 5.

After step S101, the process proceeds to step S102, where the workflow processing unit 301a outputs, to the workflow definition information management unit 306, the workflow identifier output at step S101. After step S102, the process proceeds to step S103, where the workflow definition information management unit 306 outputs to the workflow processing unit 301a, workflow definition information of a workflow corresponding to a workflow identifier output at step S102.

After step S103, the process proceeds to step S104, where the workflow processing unit 301a analyzes the workflow definition information output at step S103 to output processes included in the workflow and information pertaining to a form corresponding to each process.

After step S104, the process proceeds to step S105, where the workflow processing unit 301a outputs, to the form definition information management unit 304, the form identifier from among the information items pertaining to the form acquired at step S104. After step S105, the process proceeds to step S106, where the form definition information management unit 304 outputs, to the workflow processing unit 301a, the form definition information of the form corresponding to the form identifier output at step S105.

After step S106, the process proceeds to step S107, where the workflow processing unit 301a outputs, to the paper identifier issuing unit 360, a request to issue a paper identifier. After step S107, the process proceeds to step S108, where the paper identifier issuing unit 360 outputs, to the workflow processing unit 301a, the paper identifier issued by the paper identifier issuing unit 360.

After step S108, the process proceeds to step S109, where the workflow processing unit 301a outputs, to the paper identifier encoding unit 370, the paper identifier output at step S108. The paper identifier encoding unit 370 converts the input paper identifier into machine-readable code. After step S109, the process proceeds to step S110, where the paper identifier encoding unit 370 outputs, to the workflow processing unit 301a, an "encoded paper identifier", which is a paper identifier encoded by the paper identifier encoding unit 370.

The process from steps S102 through S106 and the process from steps S107 through S110 can be executed in an asynchronous manner. After the process from steps S101 through S110 ends, the process proceeds to step S111.

In step S111, the workflow processing unit 301a outputs, to the print data creating unit 380, the encoded paper identifier, the form definition information, the image data of the insertion image, and information on print settings. Based on this information, the print data creating unit 380 generates image data of an image to be printed out as a paper form. These image data are referred to as "print data". After step S111, the process proceeds to step S112, where the print data creating unit 380 outputs the print data to the workflow processing unit 301a.

After step S112, the process proceeds to step S113, where the workflow processing unit 301a outputs, to the currently-executing workflow managing unit 310, a paper identifier, a form identifier, and a workflow identifier. The currently-executing workflow managing unit 310 generates information of a new "currently-executing workflow" based on these identifiers, and associates the input identifiers with this information to manage the information.

After step S113, the process proceeds to step S114, where the currently-executing workflow managing unit 310 outputs, to the workflow processing unit 301a, information indicating whether the new workflow has been registered as the "currently-executing workflow".

After step S114, the process proceeds to step S115, where the workflow processing unit 301a outputs, to the network communications unit 309, the print data and a print instruction. Accordingly, the network communications unit 309 sends the print data to the MFP 1 and the MFP 1 forms the print data on a medium and outputs the printed medium. Step S115 can be performed only when information indicating that "registration is successful" is output in step S114.

Example of Process Performed on Image Data of a Paper Form with Written Input

FIG. 17 is a sequence diagram of an example of a process performed on image data obtained by scanning a paper form with written input. In step S201 of FIG. 17, the image data acquired by scanning the paper form with the MFP 1 are input to the workflow processing unit 301a. After step S201, the process proceeds to step S202, where the workflow processing unit 301a outputs, to the paper identifier searching/decoding unit 320, the image data input at step S201. The paper identifier searching/decoding unit 320 acquires an image of the code of the paper identifier from the input image, and then decodes the acquired code to acquire the paper identifier which is information for identifying paper. After step S202, the process proceeds to step S203, where the paper identifier searching/decoding unit 320 outputs, to the workflow processing unit 301a, the paper identifier acquired at step S202.

After step S203, the process proceeds to step S204, where the workflow processing unit 301a outputs, to the currently-executing workflow managing unit 310, the paper identifier output at step S203. The currently-executing workflow managing unit 310 acquires a combination of the currently-executing workflow identifier, the form identifier, and the workflow identifier corresponding to this paper identifier. After step S204, the process proceeds to step S205, where the currently-executing workflow managing unit 310 outputs, to the workflow processing unit 301a, the currently-executing workflow identifier, the form identifier, and the workflow identifier corresponding to the paper identifier.

After step S205, the process proceeds to step S206, where the workflow processing unit 301a outputs, to the workflow definition information management unit 306, the workflow identifier output at step S205. The workflow definition information management unit 306 acquires workflow definition information corresponding to this workflow identifier.

After step S206, the process proceeds to step S207, where the workflow definition information management unit 306 outputs, to the workflow processing unit 301a, the acquired workflow definition information corresponding to the workflow identifier.

After step S207, the process proceeds to step S208, where the workflow processing unit 301a analyzes the workflow definition information output at step S207, to acquire processes included in the workflow and information of forms corresponding to these processes. Furthermore, based on the information of the acquired forms, the workflow processing unit 301a determines whether the image data input at step S201 include all of the image data of images corresponding to the forms necessary for the processes. If all of the data of images corresponding to the necessary forms are included, the process proceeds to step S210, and if not, the process proceeds to step S209.

In step S209 if performed after step S208, the workflow processing unit 301a outputs to the network communications unit 309, a message reporting that there is a missing form. This message is sent to the MFP 1.

On the other hand, in step S210 if performed after step S208, the workflow processing unit 301a outputs form identifiers to the form definition information management unit 304. The form definition information management unit 304 acquires form definition information corresponding to these form identifiers. After step S210, the process proceeds to step S211, where the form definition information management unit 304 outputs, to the workflow processing unit 301a, form definition information corresponding to the form identifiers.

After step S211, the process proceeds to step S212, where the workflow processing unit 301a analyzes the form definition information output at step S211. The workflow processing unit 301a acquires position information for each entry region included in a form, or acquires a correction method for correcting image data of an image of a form and correction parameters for performing the correction.

After step S212, the process proceeds to step S213, where the workflow processing unit 301a outputs, to the image data correcting unit 330, the image data input at step S201 and the correction method and correction parameters acquired at step S212. Based on this data, the image data correcting unit 330 corrects the image data. After step S213, the process proceeds to step S214, where the image data correcting unit 330 outputs, to the workflow processing unit 301a, "corrected image data" that are obtained by correcting the image data output at step S212.

After step S214, the process proceeds to step S215, where the workflow processing unit 301a outputs, to the written image extracting unit 340, the corrected image data and the position information of the entry regions included in the form corresponding to these image data. Based on the input position information of the entry regions, the written image extracting unit 340 acquires region data of each entry region from the corrected image data, and acquires the image with written input.

After step S215, the process proceeds to step S216, where the written image extracting unit 340 outputs, to the workflow processing unit 301a, the written image data which constitute the image with written input extracted by the written image extracting unit 340.

After step S216, the process proceeds to step S217, where the workflow processing unit 301a outputs, to the written input determination unit 350, the written image data and an attribute of the entry region corresponding to the written image data. The attribute of the entry region includes, for example, the process method for the written image data and the parameter for performing the process. The written input determination unit 350 makes a determination with respect to the input written image data based on the attribute of the entry region, and acquires, for example, its validity.

After step S217, the process proceeds to step S218, where the written input determination unit 350 outputs, to the workflow processing unit 301a, results of the determination made on the written input. The results of the determination made on the written input may be, for example, a determination as to whether the written input in the entry region is valid. Base on this determination result, when it is determined that the written input is invalid, the process proceeds to step S219.

In step S219, the workflow processing unit 301a outputs, to the network communications unit 309, an error notice reporting that there has been an error in the input. Accordingly, the error notice is output to the MFP 1.

Example of Process of Generating and Outputting a Paper Form of a Next Process and Onward FIG. 18 is a sequence diagram of an example of a process of generating and outputting a paper form of a second process and onward in the same workflow. Step S301 of FIG. 18 can be performed, for example, after step S218 of FIG. 17. The process of steps S301 through S311 shown in FIG. 18 is the same as the process of steps S105 through S115 shown in FIG. 16, and is therefore not described.

Configuration of Computer

Figure 19:
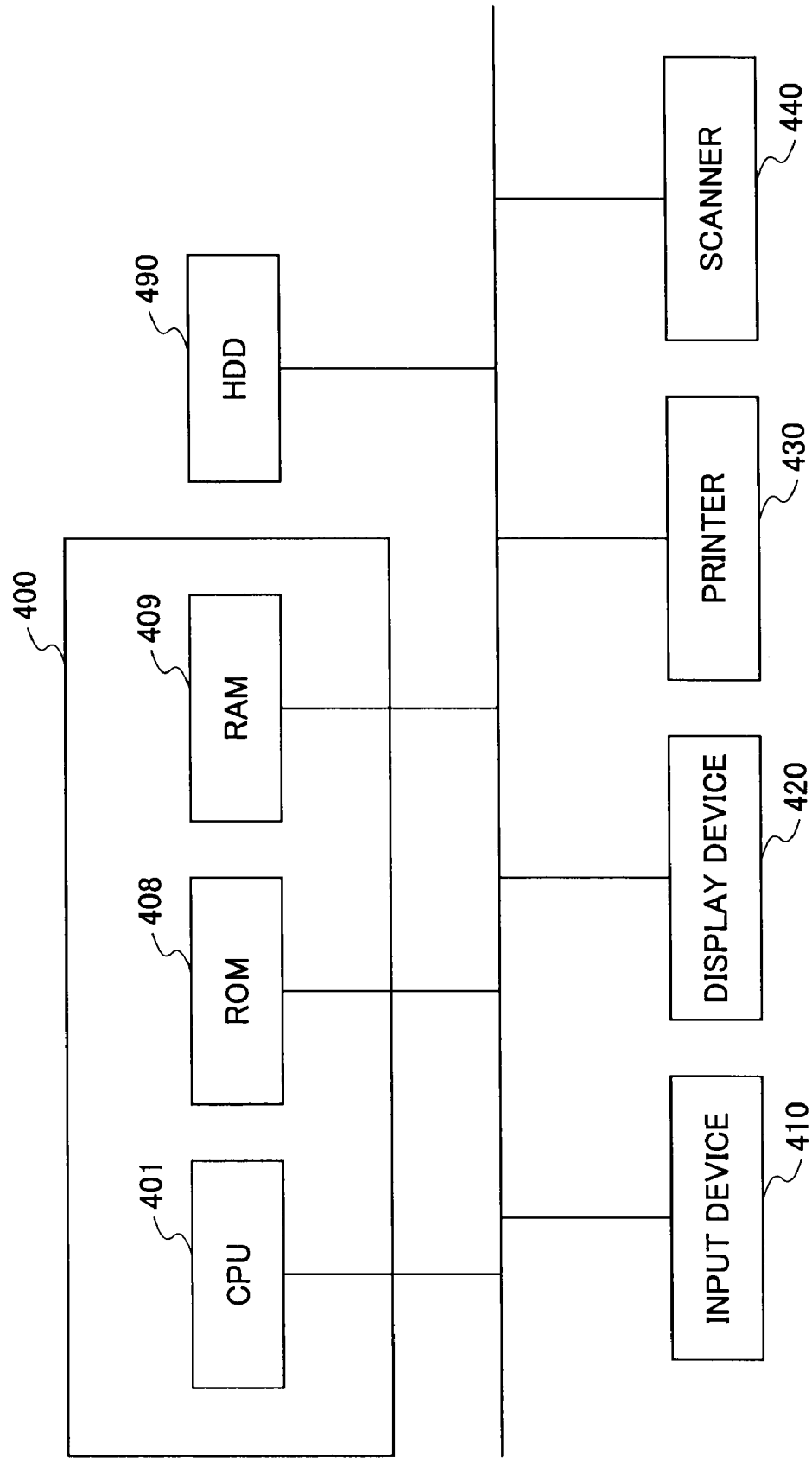
FIG. 19 is a block diagram of a computer for realizing a document processing method according to an embodiment of the present invention.

FIG. 19 is a block diagram of a computer able to realize the document processing method according to an embodiment of the present invention. The computer shown in FIG. 19 includes a main processing unit 400, an input device 410, and a display device 420. Furthermore, the computer may include a printer 430, a scanner 440, and a HDD 490. The main processing unit 400 is the main part for realizing functions of the computer, and includes a CPU 401, a ROM 408, and a RAM 409. The CPU 401 reads a computer program from the ROM 408 and loads it in the RAM 409, then executes the computer program to realize the document processing method according to an embodiment of the present invention. The ROM 408 is a nonvolatile memory for holding a program such as a computer program to be executed by the CPU 401 and necessary parameters for controlling the document processing device. The RAM 409 is a working memory used by the CPU 401 to perform a process.

The input device 410 is, for example, a keyboard, to be used by the operator to input an instruction. The display device 420 displays the status of the computer. The printer 430 is a device for forming an image on a medium and outputting the medium. The scanner 440 a device for optically scanning an image formed on a medium. The HDD 490 is for storing large amounts of data such as image data.

The computer program that causes the computer to execute the document processing method according to an embodiment of the present invention may be stored in the HDD 490 or the ROM 408, or in a recording medium that can be inserted in a drive device (not shown).

According to one embodiment of the present invention, a document processing device for processing image data includes a medium identification information acquiring unit configured to acquire medium identification information from an image of the medium identification information included in the image data; a process information acquiring unit configured to acquire, based on the medium identification information, process information pertaining to a currently-executing process in a currently-executing workflow associated with the medium identification information; a form definition information acquiring unit configured to acquire, based on the process information pertaining to the currently-executing process, form definition information of a form corresponding to the currently-executing process; and a region image acquiring unit configured to acquire, based on the form definition information, a region image of a predetermined region in the image data, which predetermined region corresponds to an entry region in the form where written-input information is written in at the currently-executing process.

Accordingly, a document processing device can be provided for identifying a currently-executing workflow from image data obtained by scanning an image on a medium.

Additionally, the document processing device further includes a workflow definition information management unit configured to manage workflow definition information pertaining to a workflow including at least two processes; and a currently-executing workflow management unit configured to manage each currently-executing workflow by associating process identification information of a currently-executing process of the corresponding workflow with the medium identification information, wherein the process information acquiring unit acquires the process identification information of the currently-executing process corresponding to the medium identification information from the currently-executing workflow management unit, and also acquires, based on the process identification information of the currently-executing process, the workflow definition information of the workflow including the currently-executing process from the workflow definition information management unit.

Accordingly, workflow definition information corresponding to a currently-executing workflow can be acquired from image data obtained by scanning an image on a medium.

Additionally, in the document processing device, the workflow definition information includes, for each process included in the workflow, form identification information of a corresponding form.

Accordingly, identification information of a form used in a process of the workflow can be acquired.

Additionally, in the document processing device, the form definition information includes entry region information pertaining to the entry region in the form that is generated based on the form definition information, which entry region is where the written-input information is written in at one of the processes corresponding to the form in the workflow.

Accordingly, a process can be performed based on information of each entry region.

Additionally, in the document processing device, the form definition information includes, for each entry region, attribute information pertaining to an attribute of the written-input information, wherein the document processing device further includes a written-input determination unit configured to determine whether the written-input information is present in the region image corresponding to the entry region or to determine a type of the written-input information; and a validity determination unit configured to determine whether the written-input information in the entry region is valid, based on the attribute information of the written-input information and also based on whether the written-input information is present, or the type of the written-input information.

Accordingly, the validity of information written in can be determined for each entry region.

Additionally, in the document processing device, the form definition information includes dependence relationship information pertaining to a dependence relationship between different entry regions included in the form that is generated based on the form definition information; and the validity determination unit further determines whether the written-input information in the entry region is valid based on the dependence relationship information.

Accordingly, the validity of information written in can be determined based on the dependence relationship between different entry regions.

Additionally, the document processing device further includes an image converting unit configured to convert the region image of an error region, which is an entry region whose written-input information is determined as being invalid by the validity determination unit, into a highlighted region image that is highlighted with respect to other entry regions; and a confirmation form generating unit configured to generate a confirmation form by combining the highlighted region image, created by the image converting unit, with the image data at a position corresponding to the error region.

Accordingly, it is possible to generate a confirmation form that is easy for the operator to confirm an erroneous region.

Additionally, the document processing device further includes a currently-executing workflow management unit configured to manage each currently-executing workflow by associating process identification information of a currently-executing process of the corresponding workflow with the medium identification information, wherein the currently-executing workflow management unit holds error-region information pertaining to the error region; and in a case where the image data are obtained by scanning an image of the confirmation form with the written-input information, the region image acquiring unit acquires the region image corresponding to the error region.

Accordingly, it is possible to perform a process on an erroneous region in image data obtained by scanning a confirmation form.

Additionally, in the document processing device, the document processing device is configured to form, on a medium, the form corresponding to the currently-executing process of the currently-executing workflow and the image of the medium identification information associated with the currently-executing process, and to output the medium, the document processing device further including a workflow definition information acquiring unit configured to acquire the workflow definition information based on workflow identification information of the currently-executing workflow; a form image generating unit configured to generate, based on the form definition information, a form image of the form, acquire the medium identification information for identifying the medium, generate the image of the medium identification information, and combine the image of the medium identification information with the form image; and an image forming unit configured to form the form image on the medium, wherein the form definition information acquiring unit acquires, based on the workflow definition information, the form definition information of the form corresponding to the currently-executing process.

Accordingly, it is possible to form a form image corresponding to a process of a workflow.

Additionally, in the document processing device, the form definition information includes entry region information pertaining to the entry region where the written-input information is written in at the currently-executing process corresponding to the form; and the form image generating unit generates the form image such that an image of the entry region is highlighted with respect to images of other entry regions.

Accordingly, it is possible to form a form image in which an entry region where written input is to be entered in a process of a workflow is highlighted with respect to other regions.

According to one embodiment of the present invention, a document processing method is performed by executing functions of units included in the document processing device.

The present invention is not limited to the specifically disclosed embodiment, and variations and modifications may be made without departing from the scope of the present invention.

The present application is based on Japanese Priority Patent Application No. 2007-137223, filed on May 23, 2007, the entire contents of which are hereby incorporated herein by reference.

What is claimed is:

1. A document processing device for processing image data, comprising:
   a medium identification information acquiring unit configured to acquire medium identification information from an image of the medium identification information included in the image data;
   a process information acquiring unit configured to acquire, based on the medium identification information, process information pertaining to a currently-executing process in a currently-executing workflow associated with the medium identification information;
   a form definition information acquiring unit configured to acquire, based on the process information pertaining to the currently-executing process, form definition information of a form corresponding to the currently-executing process;
   a region image acquiring unit configured to acquire, based on the form definition information, a region image of a predetermined region in the image data, which predetermined region corresponds to an entry region in the form where written-input information is written in at the currently-executing process; and a written image extracting unit configured to cut out the region image from the entry region in the image data, wherein for each region image that has been cut out, a process is performed for removing color, wherein for each pixel included in the region image, a brightness and color saturation is calculated, and a pixel value of a pixel having a color whose brightness and/or color saturation exceeds a predetermined value, is replaced with a background color of the form.

2. The document processing device according to claim 1, further comprising:

a workflow definition information management unit configured to manage workflow definition information pertaining to a workflow comprising at least two processes; and a currently-executing workflow management unit configured to manage each currently-executing workflow by associating process identification information of a currently-executing process of the corresponding workflow with the medium identification information, wherein:

the process information acquiring unit acquires the process identification information of the currently-executing process corresponding to the medium identification information from the currently-executing workflow management unit, and also acquires, based on the process identification information of the currently-executing process, the workflow definition information of the workflow comprising the currently-executing process from the workflow definition information management unit.

3. The document processing device according to claim 2, wherein:

the workflow definition information comprises, for each process included in the workflow, form identification information of a corresponding form.

4. The document processing device according to claim 1, wherein:

the form definition information comprises entry region information pertaining to the entry region in the form that is generated based on the form definition information, which entry region is where the written-input information is written in at one of the processes corresponding to the form in the workflow.

5. The document processing device according to claim 4, wherein:

the form definition information comprises, for each entry region, attribute information pertaining to an attribute of the written-input information, wherein the document processing device further comprises:

a written-input determination unit configured to determine whether the written-input information is present in the region image corresponding to the entry region or to determine a type of the written-input information; and a validity determination unit configured to determine whether the written-input information in the entry region is valid, based on the attribute information of the written-input information and also based on whether the written-input information is present, or the type of the written-input information.

6. The document processing device according to claim 5, wherein:

the form definition information comprises dependence relationship information pertaining to a dependence relationship between different entry regions included in the form that is generated based on the form definition information; and the validity determination unit further determines whether the written-input information in the entry region is valid based on the dependence relationship information.

7. The document processing device according to claim 5, further comprising:

an image converting unit configured to convert the region image of an error region, which is an entry region whose written-input information is determined as being invalid by the validity determination unit, into a highlighted region image that is highlighted with respect to other entry regions; and a confirmation form generating unit configured to generate a confirmation form by combining the highlighted region image, created by the image converting unit, with the image data at a position corresponding to the error region.

8. The document processing device according to claim 7, further comprising:

a currently-executing workflow management unit configured to manage each currently-executing workflow by associating process identification information of a currently-executing process of the corresponding workflow with the medium identification information, wherein:

the currently-executing workflow management unit holds error-region information pertaining to the error region; and in a case where the image data are obtained by scanning an image of the confirmation form with the written-input information, the region image acquiring unit acquires the region image corresponding to the error region.

9. The document processing device according to claim 1, wherein:

the document processing device is configured to form, on a medium, the form corresponding to the currently-executing process of the currently-executing workflow and the image of the medium identification information associated with the currently-executing process, and to output the medium, the document processing device further comprising:

a workflow definition information acquiring unit configured to acquire the workflow definition information based on workflow identification information of the currently-executing workflow;

a form image generating unit configured to generate, based on the form definition information, a form image of the form, acquire the medium identification information for identifying the medium, generate the image of the medium identification information, and combine the image of the medium identification information with the form image; and an image forming unit configured to form the form image on the medium, wherein:

the form definition information acquiring unit acquires, based on the workflow definition information, the form definition information of the form corresponding to the currently-executing process.

10. The document processing device according to claim 9, wherein:

the form definition information comprises entry region information pertaining to the entry region where the written-input information is written in at the currently-executing process corresponding to the form; and the form image generating unit generates the form image such that an image of the entry region is highlighted with respect to images of other entry regions.

11. A document processing method implemented by a computer programmed as a document processing device for processing image data, comprising:
a medium identification information acquiring step of acquiring medium identification information from an image of the medium identification information included in the image data;
a process information acquiring step of acquiring, by the document processing device based on the medium identification information, process information pertaining to a currently-executing process in a currently-executing workflow associated with the medium identification information;
a form definition information acquiring step of acquiring, based on the process information pertaining to the currently-executing process, form definition information of a form corresponding to the currently-executing process;
a region image acquiring step of acquiring, based on the form definition information, a region image of a predetermined region in the image data, which predetermined region corresponds to an entry region in the form where written-input information is written in at the currently-executing process; and
cutting out the region image from the entry region in the image data, wherein for each region image that has been cut out, a process is performed for removing color, wherein for each pixel included in the region image, the process includes calculating brightness and color saturation and replacing a pixel value of a pixel having a color whose brightness and/or color saturation exceeds a predetermined value with a background color of the form.

12. The document processing method according to claim 11, wherein:
the process information acquiring step further comprises a step of acquiring process identification information of the currently-executing process corresponding to the medium identification information, and a step of acquiring, based on the process identification information of the currently-executing process, workflow definition information pertaining to the workflow comprising the currently-executing process.

13. The document processing method according to claim 12, wherein:
the workflow definition information comprises, for each process included in the workflow, form identification information of a corresponding form.

14. The document processing method according to claim 11, wherein:
the form definition information comprises entry region information pertaining to the entry region in the form that is generated based on the form definition information, which entry region is where the written-input information is written in at one of the processes corresponding to the form in the workflow.

15. The document processing method according to claim 14, wherein:
the form definition information comprises, for each entry region, attribute information pertaining to an attribute of the written-input information, wherein the document processing method further comprises:
a written-input determination step of determining whether the written-input information is present in the region image corresponding to the entry region or determining a type of the written-input information; and
a validity determination step of determining whether the written-input information in the entry region is valid, based on the attribute information of the written-input information and also based on whether the written-input information is present, or the type of the written-input information.

16. The document processing method according to claim 15, wherein:
the form definition information comprises dependence relationship information pertaining to a dependence relationship between different entry regions included in the form that is generated based on the form definition information; and
the validity determination step further includes a step of determining whether the written-input information in the entry region is valid based on the dependence relationship information.

17. The document processing method according to claim 15, further comprising:
an image converting step of converting the region image of an error region, which is an entry region whose written-input information is determined as being invalid at the validity determination step, into a highlighted region image that is highlighted with respect to other entry regions; and
a confirmation form generating step of generating a confirmation form by combining the highlighted region image, created at the image converting step, with the image data at a position corresponding to the error region.

18. The document processing method according to claim 17, wherein:
in a case where the image data are obtained by scanning an image of the confirmation form with the written-input information, the region image acquiring step comprises a step of acquiring the region image corresponding to the error region.

19. The document processing method according to claim 11, wherein:
the document processing method is for forming, on a medium, the form corresponding to the currently-executing process of the currently-executing workflow and the image of the medium identification information associated with the currently-executing process, and for outputting the medium, the document processing method further comprising:
a workflow definition information acquiring step of acquiring the workflow definition information based on workflow identification information of the currently-executing workflow;
a form image generating step of generating, based on the form definition information, a form image of the form, acquiring the medium identification information for identifying the medium, generating the image of the medium identification information, and combining the image of the medium identification information with the form image; and
an image forming step of forming the form image on the medium, wherein:
the form definition information of the form corresponding to the currently-executing process is acquired based on the workflow definition information in the form definition information acquiring step.

20. The document processing method according to claim 19, wherein:
   the form definition information comprises entry region information pertaining to the entry region where the written-input information is written in at the currently-executing process corresponding to the form; and
   the form image is generated at the form image generating step such that an image of the entry region is highlighted with respect to images of other entry regions.

* * * * *